United States Patent [19]
Dye et al.

[11] Patent Number: 5,140,687
[45] Date of Patent: Aug. 18, 1992

[54] DATA PROCESSING APPARATUS WITH SELF-EMULATION CAPABILITY

[75] Inventors: Thomas A. Dye, Cedar Park, Tex.; Derek Roskell; Richard Simpson, both of Bedford, England; Michael Asal, Houston, Tex.; Karl M. Guttag, Missouri City, Tex.; Neil Tebbutt, Bedford, England; Jerry Van Aken, Sugar Land, Tex.

[73] Assignee: Texas Instruments Incorporated, Dallas, Tex.

[21] Appl. No.: 415,375

[22] Filed: Sep. 27, 1989

Related U.S. Application Data

[63] Continuation of Ser. No. 948,337, Dec. 31, 1986, abandoned, which is a continuation-in-part of Ser. No. 790,299, Oct. 22, 1985, abandoned.

[51] Int. Cl.$^5$ ............................................. G06F 15/62
[52] U.S. Cl. ...................................................... 395/500
[58] Field of Search ................ 364/518, 521; 340/721, 340/723, 798-800; 395/162-164

[56] References Cited

U.S. PATENT DOCUMENTS

| | | | |
|---|---|---|---|
| 4,441,154 | 4/1984 | McDonough et al. | 364/200 |
| 4,623,962 | 11/1986 | Matsumoto et al. | 364/200 |
| 4,628,467 | 12/1986 | Nishi et al. | 364/521 |
| 4,638,423 | 1/1987 | Ballard | 364/200 |
| 4,674,089 | 6/1987 | Poret et al. | 364/200 |
| 4,675,833 | 6/1987 | Cheek et al. | 364/523 |
| 4,731,742 | 3/1988 | Nishi et al. | 364/521 |
| 4,785,416 | 11/1988 | Stringer | 364/200 |
| 4,809,167 | 2/1989 | Pawloski et al. | 364/200 |

Primary Examiner—Heather R. Herndon
Attorney, Agent, or Firm—Lawrence J. Bassuk; Richard L. Donaldson; James F. Hollander

[57] ABSTRACT

A microprocessor, specially adapted for graphics processing applications, and which has a self-emulation capability by which the contents of its internal registers may be dumped or loaded to or from external memory on an instruction-by-instruction basis, is disclosed. The microprocessor has circuitry which is responsive to an emulate enable signal, or to a predetermined instruction code, so that normal execution is halted at the end of the ion, with execution jumping to a predetermined vector. Responsive to a dump signal, the microprocessor begins execution of a routine which presents a predetermined series of memory addresses on a memory bus, in conjunction with the contents of registers internal to the microprocessor. Accordingly, the addressed locations of a memory device connected to the memory bus can be written with the register contents, for subsequent interrogation by the user. Similarly, responsive instead to a load command, a routine is executed which presents the series of addresses to the memory bus and loads the internal registers with the data values presented on the memory bus. The load feature is similarly utilized by the user's loading of the addressed memory locations with the desired contents of the internal registers. A system containing a microprocessor constructed according to the invention may be configured so that the emulate enable signal is generated by the control signals generated by the microprocessor upon each instruction fetch from the external memory.

21 Claims, 19 Drawing Sheets

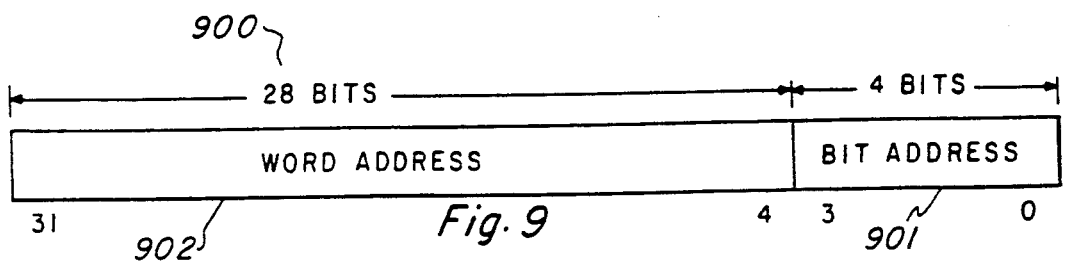

DATA PROCESSING APPARATUS WITH SELF-EMULATION CAPABILITY

This application is a continuation of application Ser. No. 06/948,337, now abandoned, filed Dec. 31, 1986, which is continuation-in-part of application Ser. No. 790,299 filed Oct. 22, 1985, now abandoned.

This application is related to applications Ser. No. 790,293 filed Oct. 22, 1985, abandoned in favor of Ser. No. 256,132, filed Oct. 5, 1988; Ser. No. 795,158 filed Nov. 5, 1985, now U.S. Pat. No. 4,718,024; Ser. No. 795,380 filed Nov. 6, 1985, now U.S. Pat. No. 4,689,807; Ser. No. 795,383 filed Nov. 6, 1985, Ser. No. 795,382 filed Nov. 6, 1985, now U.S. Pat. No. 4,752,893; Ser. No. 804,204 filed Dec. 3, 1985, abandoned in favor of Ser. No. 180,651, filed Mar. 31, 1988; Ser. No. 804,203 filed Dec. 3, 1985, abandoned in favor of Ser. No. 245,980, filed Sep. 16, 1988; Ser. No. 821,375 filed Jan. 22, 1986, abandoned in favor of Ser. No. 256,803, filed Oct. 11, 1988; Ser. No. 821,641 filed Jan. 23, 1986, abandoned in favor of Ser. No. 207,034, filed Jun. 13, 1988; Ser. No. 821,634 filed Jan. 23, 1986, abandoned and to be reviewed; Ser. No. 821,644 filed Jan. 23, 1986, abandoned and to be reviewed; and Ser. No. 821,667 filed Jan. 23, 1986, abandoned in favor of Ser. No. 217,118, filed Jul. 7, 1988; all of said applications originally co-pending.

BACKGROUND OF THE INVENTION

The present invention relates to the field of computer graphics. In particular, this invention relates to the field of bit mapped computer graphics in which the computer memory stores data for each individual picture element or pixel of the display at memory locations that correspond to the location of that pixel on the display. The field of bit mapped computer graphics has benefitted greatly from the lowered cost per bit of dynamic random access memory (DRAM). The lowered cost per bit of memory enables larger and more complex displays to be formed in the bit mapped mode.

The reduction in the cost per bit of memory and the consequent increase in the capacity of bit mapped computer graphics has led to the need for processing devices which can advantageously use the bit mapped memory in computer graphics applications. In particular, a type of device has arisen which includes the capacity to draw simple figures, such as lines and circles, under the control of the main processor of the computer. In addition, some devices of this type include a limited capacity for bit block transfer (known as BITBLT or raster operation) which involves the transfer of image data from one portion of memory to another, together with logical or arithmetic combinations of that data with the data at the destination location within the memory.

These bit-map controllers with hard wired functions for drawing lines and performing other basic graphics operations represent one approach to meeting the demanding performance requirements of bit mapped displays. The built-in algorithms for performing some of the most frequently used graphics operations provides a way of improving overall system performance. However, a useful graphics system often requires many functions in addition to those few which are implemented in such a hard wired controller. These additional required functions must be implemented in software by the primary processor of the computer. Typically these hard wired bit-map controllers permit the processor only limited access to the bit-map memory, thereby limiting the degree to which software can augment the fixed set of functional capacities of the hard wired controller. Accordingly, it would be highly useful to be able to provide a more flexible solution to the problem of controlling the contents of the bit mapped memory, either by providing a more powerful graphics controller or by providing better access to this memory by the system processor, or both.

It is further useful for a user of such a processing device which has the above-described capabilities, or of any general purpose microcomputer or microprocessor, to develop software using an emulation system. The registers internal to microcomputers and microprocessors are generally not addressable on a real-time basis, but often may only be interrogated indirectly, such as via the arithmetic logic unit. Accordingly, in order to perform accurate emulation, a special emulator system must be used. The emulator may consist of "breadboarded" hardware, or may consist of a total software emulation system executing on a general purpose computing apparatus, which mimics the operation of the emulated microcomputer by providing visibility into the internal microcomputer registers an instruction-by-instruction basis. Emulation can thus be performed by performing a single instruction, and evaluating the contents of the memory of the emulator for comparison against the expected, or desired result.

When the user is developing software for a specific application of the microcomputer, such emulation provides the advantage of immediate evaluation of the results of each instruction in the internal registers of the microcomputer. Without the ability to so evaluate the internal status of these registers, the software developer must analyze the end results of an entire sequence of instructions in order to identify the location and type of mistake in the sequence of program instructions, thereby locating the error indirectly, at best. Alternatively, the user may instead generate and execute a number of sub-programs to assist determining where the original sequence of instructions went wrong. Accordingly, an emulation system is quite valuable in saving man-hours of software development for a given system.

Even with the great value of emulation in saving man-hours in software development and debug, however, an emulation system for a given microcomputer or microprocessor can be quite expensive. The expense results from the design effort required to analyze the microcomputer or microprocessor operation, to design a hardware system which performs the operations of the microcomputer/microprocessor in the same way and acheives the same result, and to add instructions to the original microcomputer/microprocessor instruction set which are directed to analysis of the contents of the emulator's registers and memory. Besides the additional effort and cost required in building (or purchasing) such a system, it is possible that differences in hardware or software between the emulated microcomputer and the emulating system may result not only in additional errors which would not occur in the operation of the emulated microcomputer, but may also result in the failure of the emulating system to detect an error which will occur once the sequence of instructions is presented to the emulated microcomputer/microprocessor. The costs of software errors especially increases if sequences of instructions which contain such errors are incorporated into mask-programmable ROM in the microcomputer devices.

It is therefore an object of this invention to provide a microcomputer which itself may be used in the emulation of instruction sequences.

It is a further object of this invention to provide such a microcomputer which can dump the contents of its internal registers and memory into an external memory device.

It is a further object of this invention to provide such a microcomputer which can load its internal registers and memory with the contents of an external memory device.

It is a further object of this invention to provide such a microcomputer which can perform such loading and dumping on an instruction-by-instruction basis.

It is a further object of this invention to provide such capabilities in a microcomputer which is adapted to performing not only general purpose instructions, but also to performing special purpose graphic instructions.

Other objects and advantages of the invention will become apparent to those of ordinary skill in the art, having reference to the description and drawings provided herein.

SUMMARY OF THE INVENTION

The invention may be incorporated into a microcomputer having registers and an arithmetic logic unit, and which has circuitry for stopping execution of instructions by the arithmetic logic unit upon receipt of an emulation control signal (or instruction), thereby entering an emulation mode. If a dump control signal is received by the microcomputer in emulation mode, the microcomputer will execute an instruction sequence which presents the contents of its registers on its data terminals for interrogation by the user. If a load signal is received by the microcomputer in emulation mode, a sequence of instructions is executed which loads the registers with data applied to said data terminals; the selective loading of the internal contents of the microcomputer with desired data is also useful in the analysis of the operation of the microcomputer, and the debugging of its software. The microcomputer according to the invention may be incorporated into a system, with external memory operative to receive (and present) the contents of the internal register of the microcomputer, with the microcomputer presenting the necessary memory addresses in the execution of the dump and load sequences.

BRIEF DESCRIPTION OF THE DRAWINGS

These and other objects of the present invention will be readily understood from the following description, taken in conjunction with the drawings as described below.

FIG. 9 is an illustration of the address register of the graphics processor of the present invention.

FIG. 10 is an illustration of the relationship between the pins of the graphics processor local address/data bus and the bits of the address register during the row address strobe cycle and during the column address strobe cycle.

DETAILED DESCRIPTION OF THE PREFERRED EMBODIMENT

Figure 1:
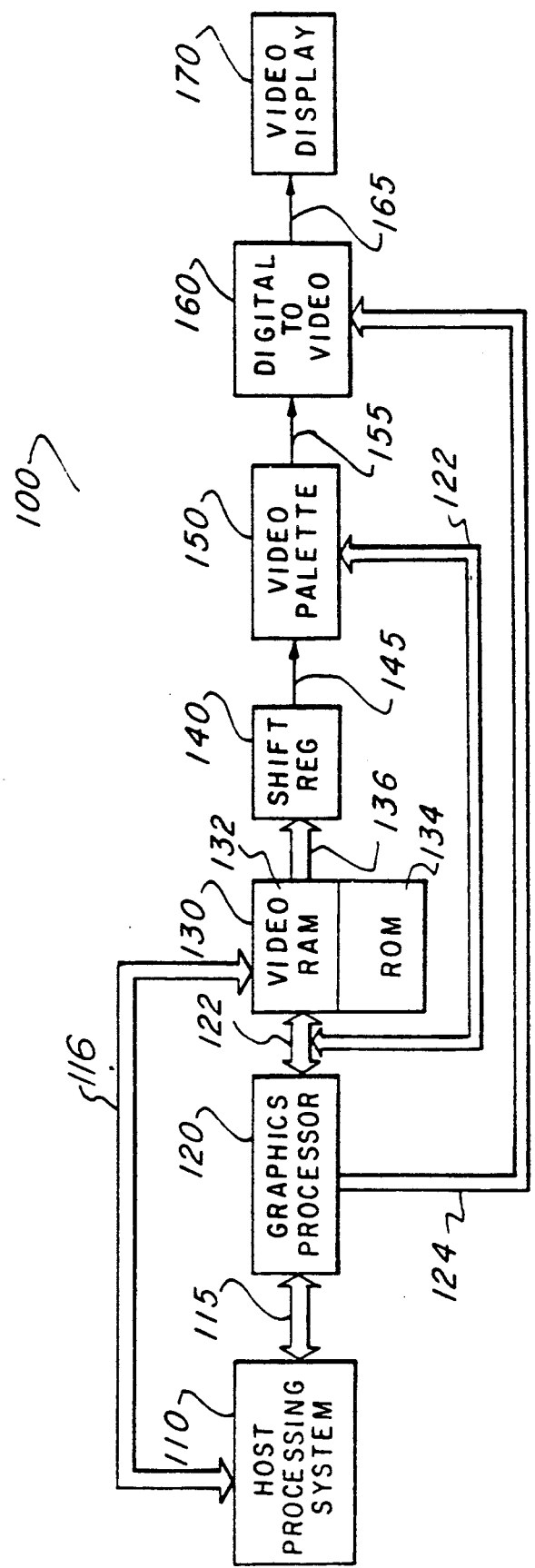
FIG. 1 illustrates a block diagram of a computer with graphics capability constructed in accordance with the principles of the present invention.

FIG. 1 illustrates a block diagram of graphics computer system 100 which is constructed in accordance with the principles of the present invention. Graphics computer system 100 includes host processing system 110, graphics processor 120, memory 130, shift register 140, video pallette 150, digital to video converter 160 and video display 170.

Host processing system 110 provides the major computational capacity for the graphics computer system 100. Host processing system 110 preferably includes at least one microprocessor, read only memory, random access memory and assorted peripheral devices for forming a complete computer system. Host processing system 110 preferably also includes some form of input device, such as a keyboard or a mouse, and some form of long term storage device such as a disk drive. The details of the construction of host processing system 110 are conventional in nature and known in the art, therefore the present application will not further detail this element. The essential feature of host processing system 110, as far as the present invention is concerned, is that host processing system 110 determines the content of the visual display to be presented to the user.

Graphics processor 120 provides the major data manipulation in accordance with the present invention to generate the particular video display presented to the user. Graphics processor 120 is bidirectionally coupled to host processing system 110 via host bus 115. In accordance with the present invention, graphics processor 120 operates as an independent data processor from host processing system 110, however it is expected that graphics processor 120 is responsive to requests from host processing system 110 via host bus 115. Graphics processor 120 further communicates with memory 130, and video palette 150 via video memory bus 122. Graphics processor 120 controls the data stored within video RAM 132 via video memory bus 122. In addition, graphics processor 120 may be controlled by programs stored in either video RAM 132 or read only memory 134. Read only memory 134 may additionally include various types of graphic image data, such as alphanumeric characters in one or more font styles and frequently used icons. In addition, graphics processor 120 controls the data stored within video palette 150. This feature will be further disclosed below. Lastly, graphics processor 120 controls digital to video converter 160 via video control bus 124. Graphics processor 120 may control the line length and the number of lines per frame of the video image presented to the user by control of digital to video converter 160 via video control bus 124.

Video memory 130 includes video RAM 132 which is bidirectionally coupled to graphics processor 120 via video memory bus 122 and read only memory 134. As previously stated, video RAM 132 includes the bit mapped graphics data which controls the video image presented to the user. This video data may be manipulated by graphics processor 120 via video memory bus 122. In addition, the video data corresponding to the current display screen is output from video RAM 132 via video output bus 136. The data from video output bus 136 corresponds to the picture element to be presented to the user. In the preferred embodiment video RAM 132 is formed of a plurality of TMS4161 -64K dymanic random access integrated circuits available from Texas Instruments Corporation, the assignee of the present application. The TMS4161 integrated circuit includes dual ports, enabling display refresh and display update to occur without interference. For purposes of utilizing the self-emulation capabilities of graphics processor 120, video memory 130 is also connected to host processor 110 by way of bidirectional bus 116. It should be noted that bidirectional bus 116 may alternatively connect host processor 110 to video memory bus 122, rather than providing a separate path to video memory 130 as shown in FIG. 1.

Shift register 140 receives the video data from video RAM 130 and assembles it into a display bit stream. In accordance with the typical arrangement of video random access memory 132, this memory consists of a bank of several separate random access memory integrated circuits. The output of each of these integrated circuits is typically only a single bit wide. Therefore, it is necessary to assemble data from a plurality of these circuits in order to obtain a sufficiently high data output rate to specify the image to be presented to the user. Shift register 140 is loaded in parallel from video output bus 136. This data is output in series on line 145. Thus shift register 140 assembles a display bit stream which provides video data at a rate high enough to specify the individual dots within the raster scanned video display.

Video palette 150 receives the high speed video data from shift register 140 via bus 145. Video palette 150 also receives data from graphics processor 120 via video memory bus 122. Video palette 150 converts the data received on bus 145 into a video level output on bus 155. This conversion is achieved by means of a lookup table which is specified by graphics processor 120 via video memory bus 122. The output of video palette 150 may comprise color hue and saturation for each picture element or may comprise red, green and blue primary color levels for each pixel. The table of conversion from the code stored within video memory 132 and the digital levels output via bus 155 is controlled from graphics processor 120 via video memory bus 122.

Digital to video converter 160 receives the digital video information from video palette 150 via bus 155. Digital to video converter 160 is controlled by graphics processor 120 via video control bus 124. Digital to video converter 160 serves to convert the digital output of video palette 150 into the desired analog levels for application to video display 170 via video output 165. Digital to video converter 160 is controlled for a specification of the number of pixels per horizontal line and the number of lines per frame, for example, by graphics processor 120 via video controller bus 124. Data within graphics processor 120 controls the generation of the synchronization and blanking signals and the retrace signals by digital to video converter 160. These portions of the video signal are not specified by the data stored within video memory 132, but rather form the control signals necessary for specification of the desired video output.

Lastly, video display 170 receives the video output from digital to video converter 160 via video output line 165. Video display 170 generates the specified video image for viewing by the operator of graphics computer system 100. It should be noted that video palette 150, digital to video converter 160 and video display 170 may operate in accordance to two major video techniques. In the first, the video data is specified in terms of color hue and saturation for each individual pixel. In the other technique, the individual primary color levels of red, blue and green are specified for each individual pixel. Upon determination of the design choice of which of these major techniques to be employed, video palette 150, digital to converter 160 and video display 170 must be constructed to be compatible to this technique. However, the principles of the present invention in regard to the operation of graphics processor 120 are unchanged regardless of the particular design choice of video technique.

Figure 2:
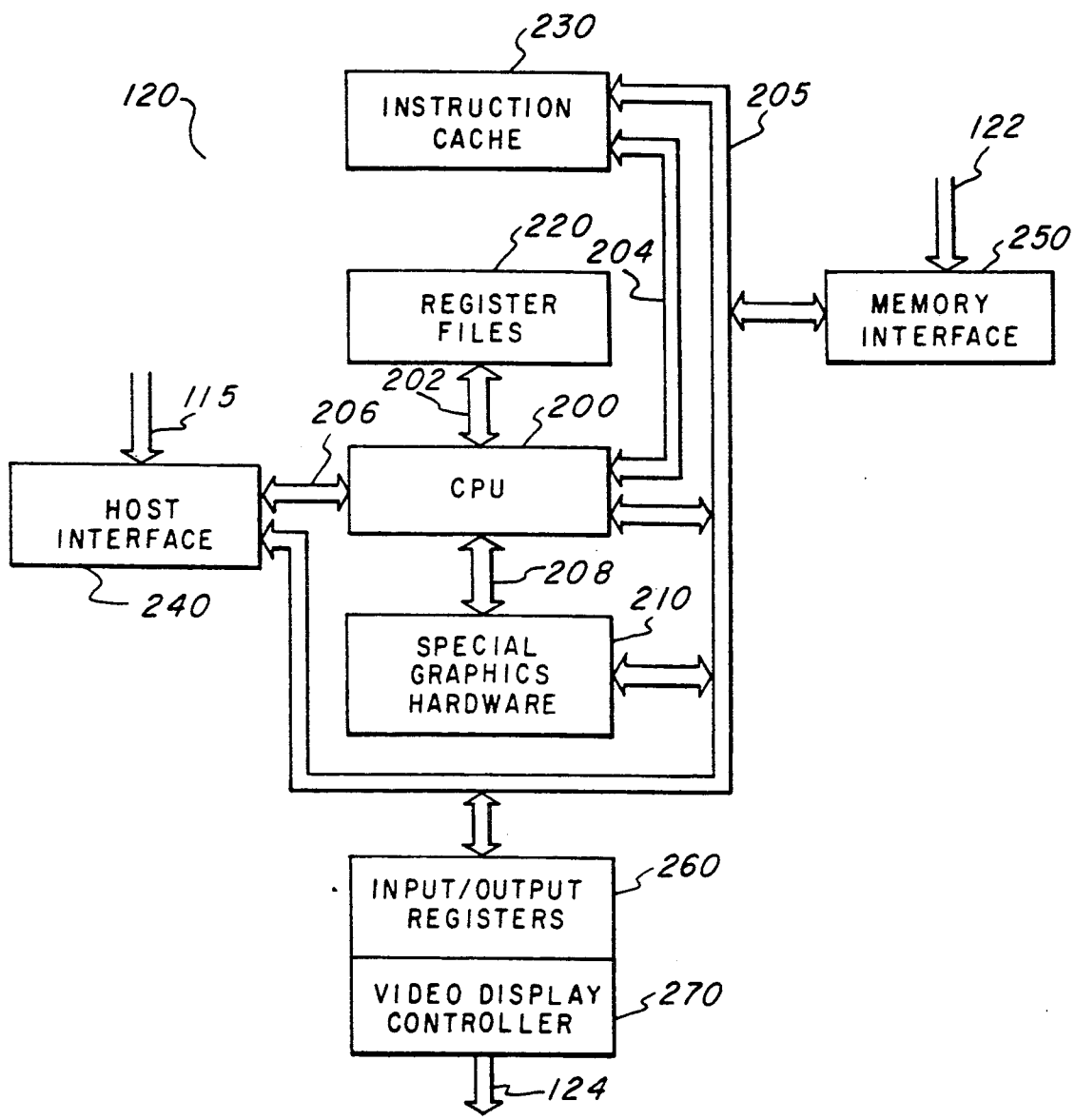
FIG. 2 is a block diagram illustrating the construction of a preferred embodiment of the graphics processing apparatus of the present invention.

FIG. 2 illustrates graphics processor 120 in further detail. Graphics processor 120 includes central processing unit 200, special graphics hardware 210, register files 220, instruction cache 230, host interface 240, memory interface 250, input/output registers 260 and video display controller 270.

The heart of graphics processor 120 is central processing unit 200. Central processing unit 200 includes the capacity to do general purpose data processing including a number of arithmetic and logic operations normally included in a general purpose central processing unit. In addition, central processing unit 200 controls a number of special purpose graphics instructions, either alone or in conjunction with special graphics hardware 210.

Graphics processor 120 includes a major bus 205 which is connected to most parts of graphics processor 120 including the central processing unit 200. Central processing unit 200 is bidirectionally coupled to a set of register files, including a number of data registers, via bidirectional register bus 202. Register files 220 serve as the depository of the immediately accessible data used by central processing unit 200. As will be further detailed below, register files 220 includes in addition to general purpose registers which may be employed by central processing unit 200, a number of data registers which are employed to store implied operands for graphics instructions.

Central processing unit 200 is connected to instruction cache 230 via instruction cache bus 204. Instruction cache 230 is further coupled to general bus 205 and may be loaded with instruction words from the video memory 130 via video memory bus 122 and memory interface 250. The purpose of instruction cache 230 is to speed up the execution of certain functions of central processing unit 200. A repetitive function or function that is used often within a particular portion of the program executed by central processing unit 200 may be stored within instruction cache 230. Access to instruction cache 230 via instruction cache bus 204 is much faster than access to video memory 130. Thus, the program executed by central processing unit 200 may be speeded up by preliminarily loading the repeated or often used sequences of instructions within instruction cache 230. Then these instructions may be executed more rapidly because they may be fetched more rapidly. Instruction cache 230 need not always contain the same sets of instructions, but may be loaded with a particular set of instructions which will be often used within a particular portion of the program executed by central processing unit 200.

Figure 2A:
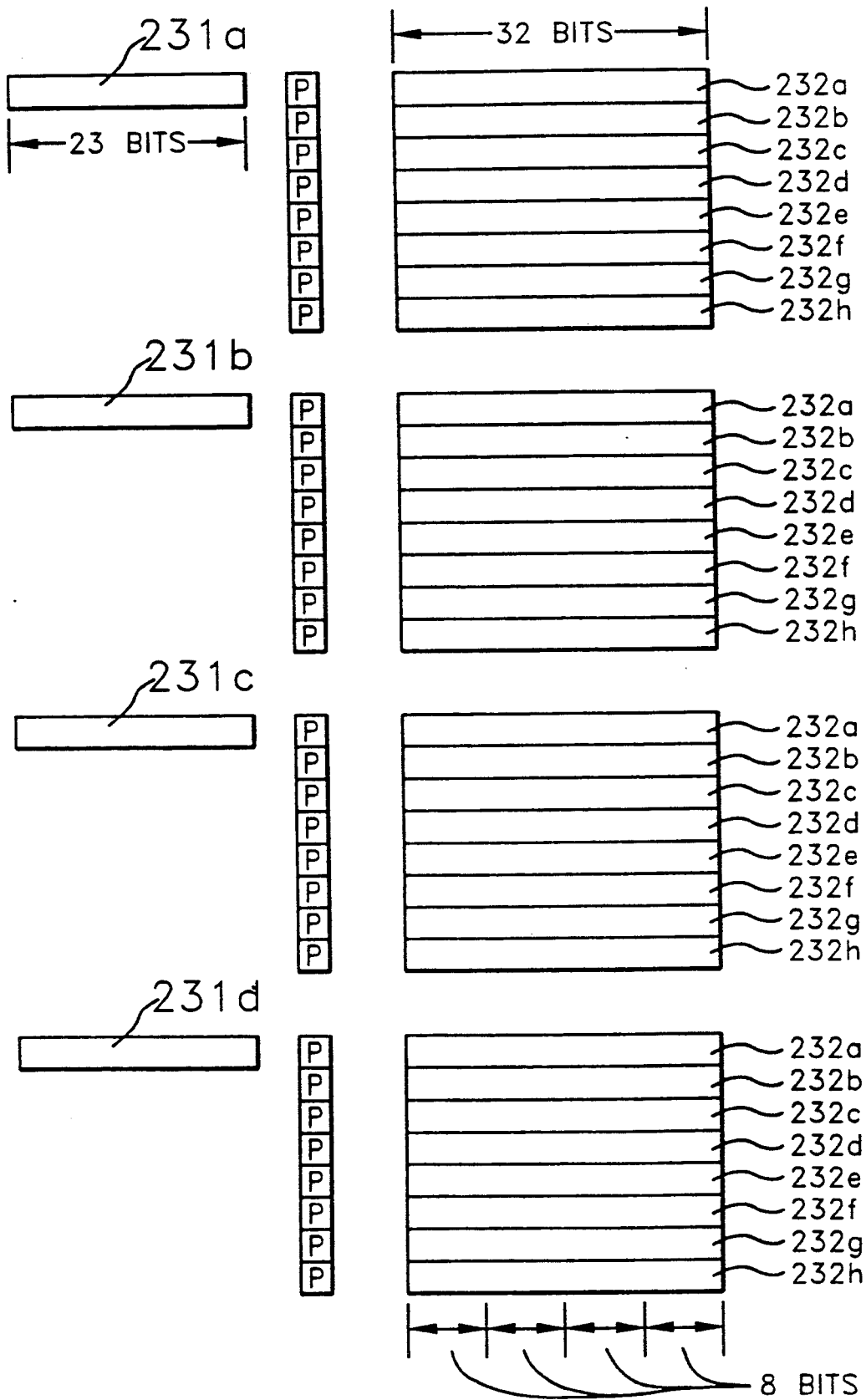
FIG. 2a illustrates the register contents of the instruction cache of the preferred embodiment of the invention.

The comparison of an instruction address to determine if the instruction is contained in instruction cache 230 is accomplished by comparison of the address of the desired instruction with the addresses of instructions contained in the registers of instruction cache 230. Referring to FIG. 2a, this comparison is done by central processing unit (CPU) 200 of this embodiment, with the comparison done in stages of the thirty-two bit instruction address used by graphics processor 120. Instruction cache 230 contains four 23-bit segment start address registers 231a through 231d, each of which contains the twenty-three most significant bits of addresses corresponding to instructions stored by instruction cache 230. If the twenty-three most significant bits of the address for the instruction to be fetched does not match the contents of any of the four segment start address registers 231a through 231d (a cache "miss"), the instruction must be fetched from external program memory, such as video RAM 132 or ROM 134, via video memory bus 122. If a match is found, the next three most significant bits of the desired address are decoded to select one of the eight portions (or subsegments) corresponding to the matching segment start address. The P flag corresponding to the desired subsegment is then evaluated. If the P flag is set, the desired instruction code is stored in the corresponding one of the eight thirty-two bit subsegment registers 232a through 232h corresponding to the matching segment. The next two most significant bits of the desired address (the four least significant bits in an instruction address in this embodiment being always zero) are decoded to determine which one of the four eight-bit words within the corresponding subsegment registers 232a through 232h contains the instruction code to be fetched. The instruction word within the selected subsegment register 232a through 232h is then communicated to CPU 200 via instruction cache bus 204. If the P flag corresponding to the desired subsegment is not set, the subsegment register 232a through 232h corresponding to the desired address is not loaded with the desired instruction, and an instruction fetch from external program memory is required, even though the segment start address is a match.

It should be noted that graphics processor 120 contains well known logic for flushing and rewriting the contents of instruction cache 230. Rewriting of a portion of instruction cache 230, such as the contents of one of the segment start address registers 231a through 231d, and the subsegment registers 232a through 232h associated with the rewritten segment, is often desirable in the event of a cache miss. A "least recently used" algorithm may be used to determine the one of segment start address registers 231a through 231d (and associated subsegment registers 232a through 232h) is to be rewritten, thereby minimizing the likelihood of subsequent cache misses. As data is loaded into the individual subsegment registers 232a through 232h of instruction cache 230, the P flag for the subsegment is set. The flushing of instruction cache 230 may be done by resetting the P flags for each of the subsegment registers 232a through 232h for each of the segment start address registers 231a through 231d.

Host interface 240 is coupled to central processing unit 200 via host interface bus 206. Host interface 240 is further connected to the host processing system 110 via host system bus 115. Host interface 240 serves to control the communication between the host processing system 110 and the graphics processor 120. Host interface 240 controls the timing of data transfer between host processing system 110 and graphics processor 120. In this regard, host interface 240 enables either host processing system 110 to interrupt graphics processor 120 or vice versa enabling graphics processor 120 to interrupt host processing system 110. In addition, host interface 240 is coupled to the major bus 205 enabling the host processing system 110 to control directly the data stored within memory 130. Typically host interface 240 would communicate graphics requests from host processing system 110 to graphics processor 120, enabling the host system to specify the type of display to be generated by video display 170 and causing graphics processor 120 to perform a desired graphic function.

Central processing unit 200 is coupled to special graphics hardware 210 via graphics hardware bus 208. Special graphics hardware 210 is further connected to major bus 205. Special graphics hardware 210 operates in conjunction with central processing unit 200 to perform special graphic processing operations. Central processing unit 200, in addition to its function of providing general purpose data processing, controls the application of the special graphics hardware 210 in order to perform special purpose graphics instructions. These special purpose graphics instructions concern the manipulation of data within the bit mapped portion of video RAM 132. Special graphic hardware 210 operates under the control of central processing unit 200 to enable particular advantageous data manipulations regarding the data within video RAM 132.

Memory interface 250 is coupled to major bus 205 and further coupled to video memory bus 122. Memory interface 250 serves to control the communication of data and instructions between graphics processor 120 and memory 130. Memory 130 includes both the bit mapped data to be displayed via video display 170 and instructions and data necessary for the control of the operation of graphics processor 120. These functions include control of the timing of memory access, and control of data and memory multiplexing. In the preferred embodiment, video memory bus 122 includes multiplexed address and data information. Memory interface 250 enables graphics processor 120 to provide the proper output on video memory bus 122 at the appropriate time for access to memory 130.

Graphics processor 120 lastly includes input/output registers 260 and video display controller 270. Input/output registers 260 are bidirectionally coupled to major bus 205 to enable reading and writing within these registers. Input/output registers 260 are preferably within the ordinary memory space of central processing unit 200. Input/output registers 260 include data which specifies the control parameters of video display controller 270. In accordance with the data stored within the input/output registers 260, video display controller 270 generates the signals on video control bus 124 for the desired control of digital to video converter 160. Data within input/output registers 260 includes data for specifying the number of pixels per horizontal line, the horizontal synchronization and blanking intervals, the number of horizontal lines per frame and the vertical synchronization blanking intervals. Input/output registers 260 may also include data which specifies the type of frame interlace and specifies other types of video control functions. Lastly, input/output registers 260 is a depository for other specific kinds of input and output parameters which will be more fully detailed below.

Graphics processor 120 operates in two differing address modes to address memory 130. These two address modes are X Y addressing and linear addressing. Because the graphics processor 120 operates on both bit mapped graphic data and upon conventional data and instructions, different portions of the memory 130 may be accessed most conveniently via differing addressing modes. Regardless of the particular addressing mode selected, memory interface 250 generates the proper physical address for the appropriate data to be accessed. In linear addressing, the start address of a field is formed of a single multibit linear address. The field size is determined by data within a status register within central processing unit 200. In X Y addressing the start address is a pair of X and Y coordinate values. The field size is equal to the size of a pixel, that is the number of bits required to specify the particular data at a particular pixel.

Figure 3:
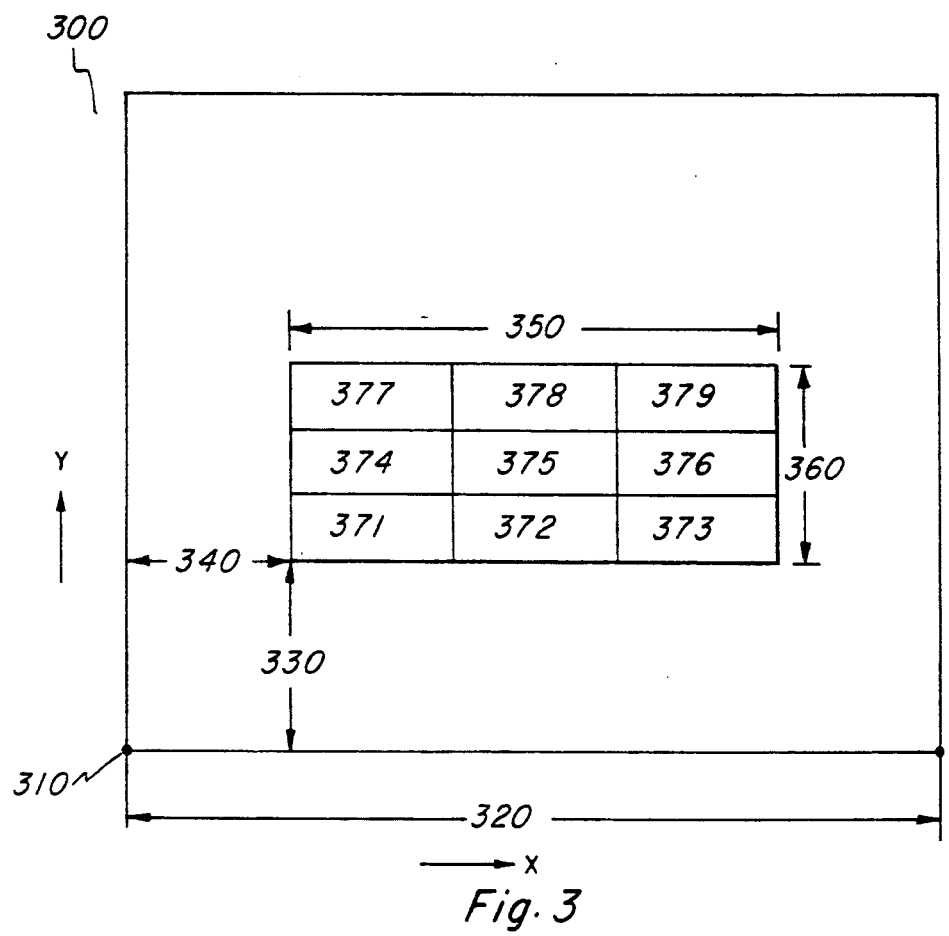
FIG. 3 illustrates the manner of specifying individual pixel addresses within the bit mapped memory in accordance with the X Y addressing technique.
Figure 4:
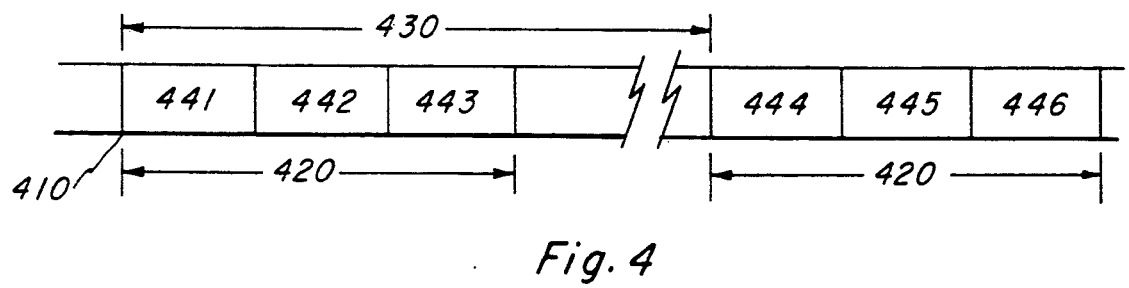
FIG. 4 illustrates a manner of specifying field addresses in accordance with the linear addressing technique.

FIG. 3 illustrates the arrangement of pixel data in accordance with an X Y addressing mode. Similarly, FIG. 4 illustrates the arrangement of similar data in accordance with the linear addressing mode. FIG. 3 shows origin 310 which serves as the reference point of the X Y matrix of pixels. The origin 310 is specified as an X Y start address and need not be the first address location within memory. The location of data corresponding to an array of pixels, such as a particular defined image element, is specified in relation to the origin address 310. This includes an X start address 340 and a Y start address 330. Together with the origin, X start address 340 and Y start address 330 indicates the starting address of the first pixel data 371 of the particular image desired. The width of the image in pixels is indicated by a quantity delta X 350. The height of the image in pixels is indicated by a quantity delta Y 360. In the example illustrated in FIG. 3, the image includes nine pixels labeled 371 through 379. The last parameter necessary to specify the physical address for each of these pixels is the screen pitch 320 which indicates the width of the memory in number of bits. Specification of these parameters, namely X starting address 340, Y starting address 330, delta X 350, delta Y 360 and screen pitch 320, enable memory interface 250 to provide the specified physical address based upon the specified X Y addressing technique.

FIG. 4 similarly illustrates the organization of memory in the linear format. A set of fields 441 to 446, which may be the same as pixels 371 through 376 illustrated in FIG. 3, is illustrated in FIG. 4. The following parameters are necessary to specify the particular elements in accordance with the linear addressing technique. Firstly, start address 410 is the linear start address of the beginning of the first field 441 of the desired array. A second quantity delta X 420 indicates the length of a particular segment of fields in number of bits. A third quantity delta Y (not illustrated in FIG. 4) indicates the number of such segments within the particular array. Lastly, linear pitch 430 indicates the difference in linear start address between adjacent array segments. As in the case of X Y addressing, specification of these linear addressing parameters enables memory interface 250 to generate the proper physical address specified.

The two addressing modes are useful for differing purposes. The X Y addressing mode is most useful for that portion of video RAM 132 which includes the bit map data, called the screen memory which is the portion of memory which controls the display. The linear addressing mode is most useful for off screen memory such as for instructions and for image data which is not currently displayed. This latter category includes the various standard symbols such as alphanumeric type fonts and icons which are employed by the computer system. It is sometimes desirable to be able to convert an X Y address to a linear address. This conversion takes place in accordance with the following formula:

$$LA = OFF + (Y \times SP) + (X \times PS)$$

Where: LA is the linear address; OFF is the screen offset, the linear address of the origin of the X Y coordinate system; Y is the Y address; SP is the screen pitch in bits; X is the X address; and PS is the pixel size in bits. Regardless of which addressing mode is employed, memory interface 250 generates the proper physical address for access to memory 130.

Figure 5:
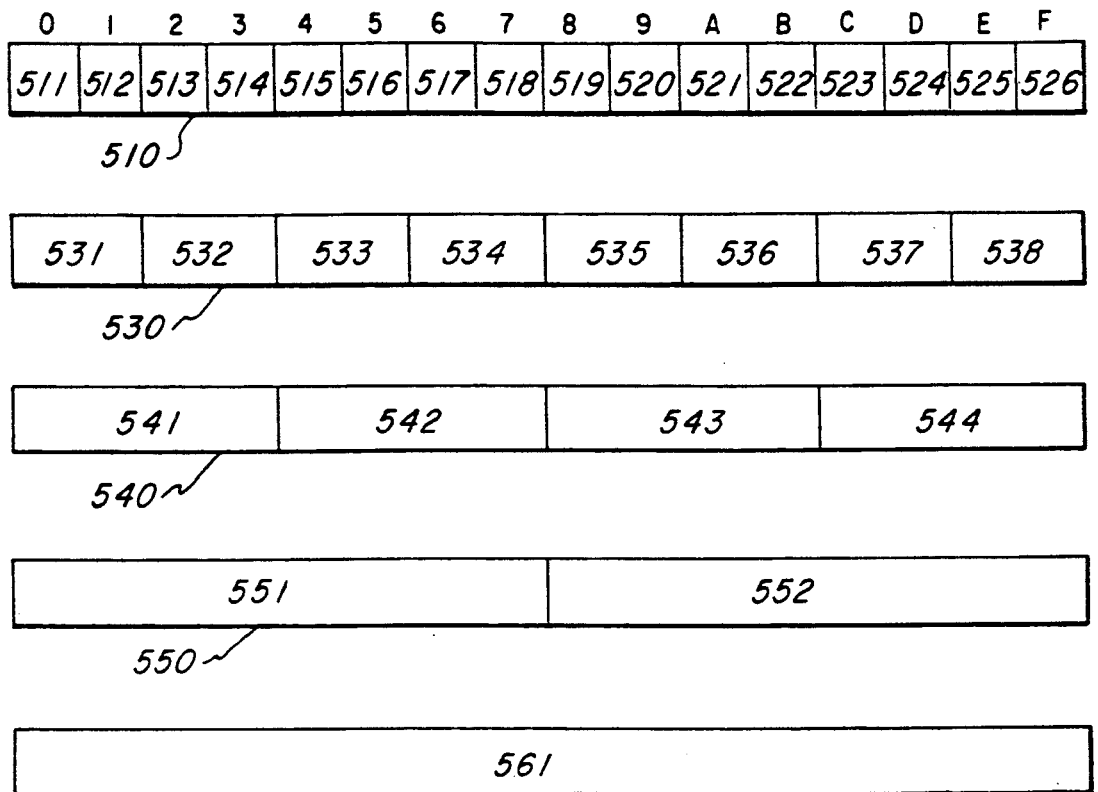
FIG. 5 illustrates the storage of pixel data of varying lengths within a single data word in accordance with the preferred embodiment of the graphics processing apparatus.

FIG. 5 illustrates the manner of pixel storage within data words of memory 130. In accordance with the preferred embodiment of the present invention, memory 130 consists of data words of 16 bits each. These 16 bits are illustrated schematically in FIG. 5 by the hexadecimal digits 0 through F. In accordance with the preferred embodiment of the present invention, the number of bits per pixel within memory 130 is an integral power of 2 but no more than 16 bits. As thus limited, each 16 bit word within memory 130 can contain an integral number of such pixels. FIG. 5 illustrates the five available pixel formats corresponding to pixel lengths of 1, 2, 4, 8 and 16 bits. Data word 510 illustrates 16 one bit pixels 511 to 526 thus 16 one bit pixels may be disposed within each 16 bit word. Data word 530 illustrates 8 two bit pixels 531 to 538 which are disposed within the 16 bit data word. Data word 540 illustrates 4 four bit pixels 541 to 544 within the 16 bit data word. Data word 550 illustrates 2 eight bit pixels 551 and 552 within the 16 bit word. Lastly, data word 560 illustrates a single 16 bit pixel 561 stored within the 16 bit data word. By providing pixels in this format, specifically each pixel having an integral power of two number of bits and aligned with the physical word boundaries, pixel manipulation via graphics processor 120 is enhanced. This is because processing each physical word manipulates an integral number of pixels. It is contemplated that within the portion of video RAM 132 which specifies the video display that a horizontal line of pixels is designated by a string of consecutive words such as illustrated in FIG. 5.

Figure 6:
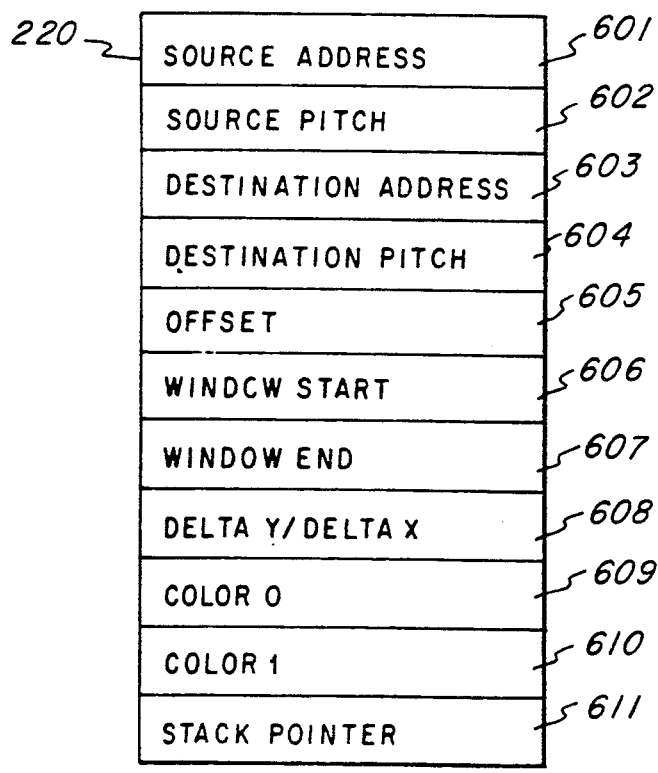
FIG. 6 illustrates the arrangement of contents of implied operands stored within the register memory in accordance with the preferred embodiment of the graphics processing apparatus.

FIG. 6 illustrates the contents of some portions of register files 220 which store implied operands for various graphics instructions. Each of the registers 601 through 611 illustrated in FIG. 6 are within the register address space of central processing unit 200 of graphics processor 120. Note, these register files illustrated in FIG. 6 are not intended to include all the possible registers within register files 220. On the contrary, a typical system will include numerous general purpose undesignated registers which can be employed by central processing unit 200 for a variety of program-specified functions.

Register 601 stores the source address. This is the address of the lower left corner of the source array. This source address is the combination of X address 340 and Y address 330 in the X Y addressing mode or the linear start address 410 in the linear addressing mode.

Register 602 stores the source pitch or the difference in linear start addresses between adjacent rows of the source array. This is either screen pitch 340 illustrated in FIG. 3 or linear pitch 430 illustrated in FIG. 4 depending upon whether the X Y addressing format or the linear addressing format is employed.

Registers 603 and 604 are similar to registers 601 and 602, respectively, except that these registers include the destination start address and the destination pitch. The destination address stored in register 603 is the address of the lower left hand corner of the destination array in either X Y addressing mode or linear addressing mode. Similarly, the destination pitch stored in register 604 is the difference in linear starting address of adjacent rows, that is either screen pitch 320 or linear pitch 430 dependent upon the addressing mode selected.

Register 605 stores the offset. The offset is the linear bit address corresponding to the origin of the coordinates of the X Y address scheme. As mentioned above, the origin 310 of the X Y address system does not necessarily belong to the physical starting address of the memory. The offset stored in register 605 is the linear start address of the origin 310 of this X Y coordinate system. This offset is employed to convert between linear and X Y addressing.

Registers 606 and 607 store addresses corresponding to a window within the screen memory. The window start stored in register 606 is the X Y address of the lower left hand corner of a display window. Similarly, register 607 stores the window end which is the X Y address of the upper right hand corner of this display window. The addresses within these two registers are employed to determine the boundaries of the specified display window. In accordance with the well known graphics techniques, images within a window within the graphics display may differ from the images of the background. The window start and window end addresses contained in these registers are employed to designate the extent of the window in order to permit graphics processor 120 to determine whether a particular X Y address is inside or outside of the window.

Register 608 stores the delta Y/delta X data. This register is divided into two independent halves, the upper half (higher order bits) designating the height of the source array (delta Y) and the lower half (lower order bits) designating the width of the source array (delta X). The delta Y/delta X data stored in register 608 may be provided in either the X Y addressing format or in the linear addressing format depending upon the manner in which the source array is designated. The meaning of the two quantities delta X and delta Y are discussed above in conjunction with FIGS. 3 and 4.

Registers 609 and 610 each contain pixel data. Color 0 data stored in register 609 contains a pixel value replicated throughout the register corresponding to a first color designated color 0. Similarly, color 1 data stored in register 610 includes a pixel value replicated throughout the register corresponding to a second color value designated color 1. Certain of the graphics instructions of graphics processor 120 employ either or both of these color values within their data manipulation. The use of these registers will be explained further below.

Lastly, the register file 220 includes register 611 which stores the stack pointer address. The stack pointer address stored in register 611 specifies the bit address within video RAM 132 which is the top of the data stack. This value is adjusted as data is pushed onto the data stack or popped from the data stack. This stack pointer address thus serves to indicate the address of the last entered data in the data stack.

Figure 7:
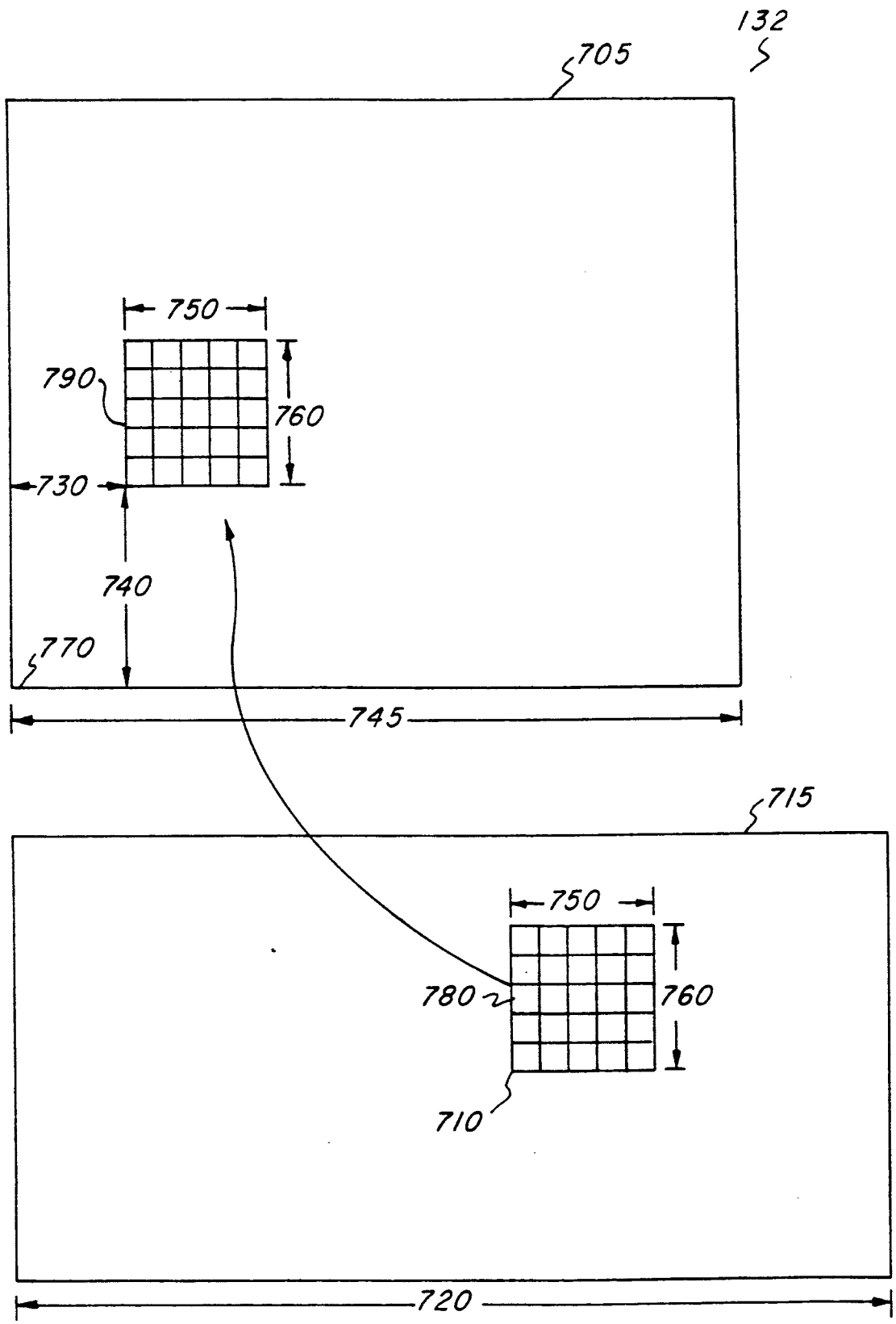
FIG. 7 illustrates the characteristics of an array move operation within the bit mapped memory of the present invention.

FIG. 7 illustrates in schematic form the process of an array move from off screen memory to screen memory. FIG. 7 illustrates video RAM 132 which includes screen memory 705 and off screen memory 715. In FIG. 7 an array of pixels 780 (or more precisely the data corresponding to an array of pixels) is transferred from off screen memory 715 to screen memory 705, becoming an array of pixels 790.

Prior to the performing the array move operation certain data must be stored in the designated resisters of register files 220. Register 601 must be loaded with the beginning address 710 of the source array of pixels. In the example illustrated in FIG. 7 this is designated in linear addressing mode. The source pitch 720 is stored in register 602. Register 603 is loaded with the destination address. In the example illustrated in FIG. 7 this is designated in X Y addressing mode including X address 730 and Y address 740. Register 604 has the destination pitch 745 stored therein. The linear address of the origin of the X Y coordinate system, offset address 770, is stored in register 605. Lastly, delta Y 750 and delta X 760 are stored in separate halves of register 608.

The array move operation illustrated schematically in FIG. 7 is executed in conjunction with the data stored in these registers of register file 220. In accordance with the preferred embodiment the number of bits per pixel is selected so that an integral number of pixels are stored in a single physical data word. By this choice, the graphics processor may transfer the array of pixels 780 to the array of pixels 790 largely by transfer of whole data words. Even with this selection of the number of bits per pixel in relation to the number of bits per physical data word, it is still necessary to deal with partial words at the array boundaries in some cases. However, this design choice serves to minimize the need to access and transfer partial data words.

In accordance with the preferred embodiment of the present invention, the data transfer schematically reresented by FIG. 7 is a special case of a number of differing data transformations. The pixel data from the corresponding address locations of the source image and the destination image are combined in a manner designated by the instruction. The combination of data may be a logical function (such as AND or OR) or it may be an arithmetic function (such as addition or subtraction). The new data thus stored in the array of pixels 790 is a function of both the data of the array of pixels 780 and the current data of pixels 790. The data transfer illustrated in FIG. 7 is only a special case of this more general data transformation in which the data finally stored in the destination array does not depend upon the data previously stored there.

Figure 8:
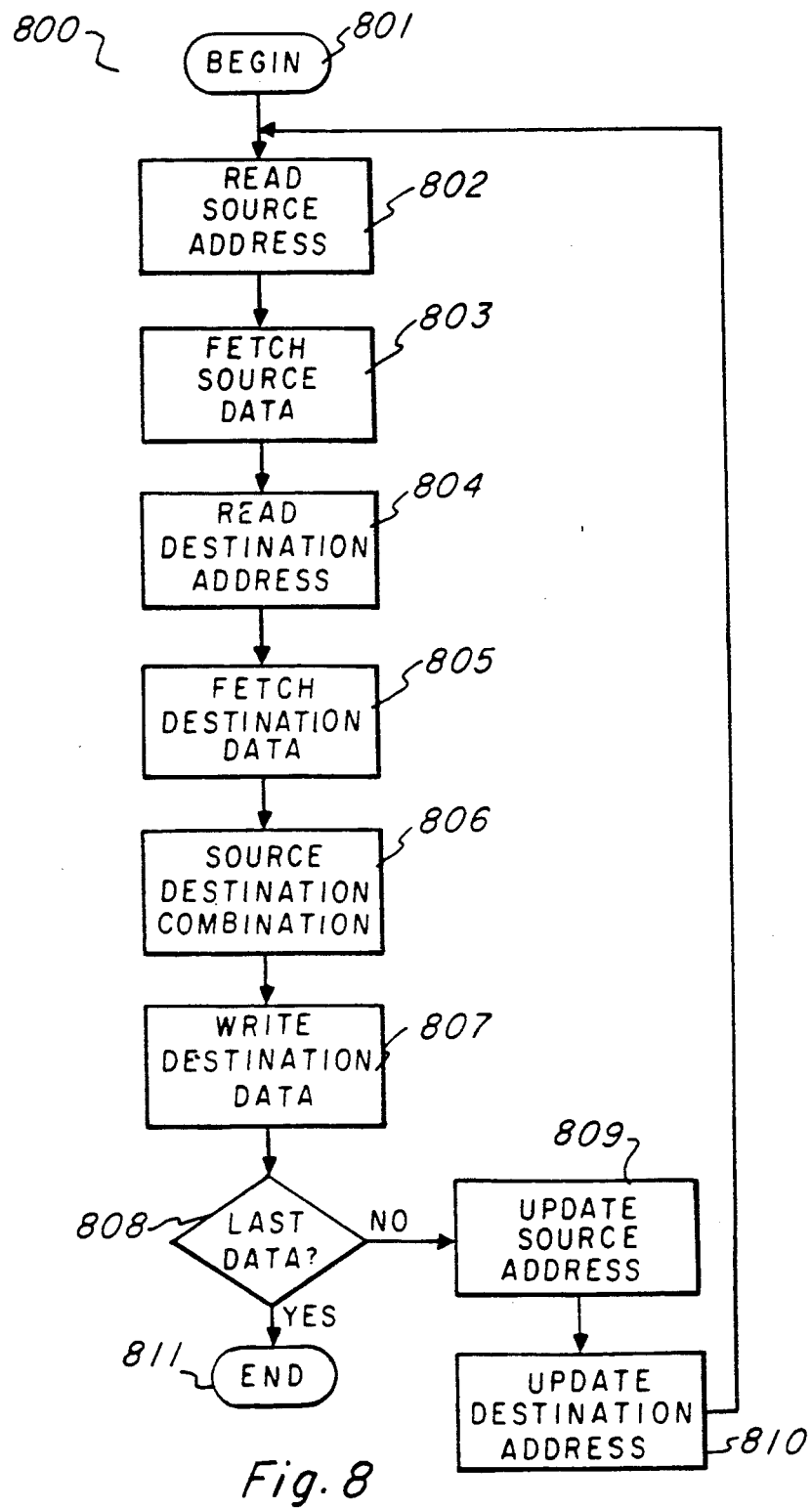
FIG. 8 illustrates a flow chart of a bit block transfer or array move operation in accordance with the present invention.

This process is illustrated by the flow chart in FIG. 8. In accordance with the preferred embodiment the transfer takes place sequentially by physical data words. Once the process begins (start block 801) the data stored in the register 601 is read to obtain the source address (processing block 802). Next graphics processor 120 fetches the indicated physical data word from memory 130 corresponding to the indicated source address (processing block 803). In the case that the source address is specified in the X Y format, this recall of data would include the steps of converting the X Y address into the corresponding physical address. A similar process of recall of the destination address from register 603 (processing block 804) and then fetching of the indicated physical data word (processing block 805) takes place for the data contained at the destination location.

This combined data is then restored in the destination location previously determined (processing block 806). The source and destination pixel data are then combined in accordance with the combination mode designated by the particular data transfer instruction being executed. This is performed on a pixel by pixel basis even if the physical data word includes data corresponding to more than one pixel. This combined data is then written into the specified destination location (processing block 807).

In conjunction with the delta Y/delta X information stored in register 608, graphics processor 120 determines whether or not the entire data transfer has taken place (decision block 808) by detecting whether the last data has been transfered. If the entire data transfer has not been performed, then the source address is updated. In conjunction with the source address previously stored in register 601 and the source pitch data stored in register 602 the source address stored in register 601 is updated to refer to the next data word to be transferred (processing block 809). Similarly, the destination address stored in register 603 is updated in conjunction with the destination pitch data stored in register 604 to refer to the next data word in the destination (processing block 810). This process is repeated using the new source stored in register 601 and the new destination data stored in register 603.

As noted above the delta Y/delta X data stored in register 608 is used to define the limits of the image to be transferred. When the entire image has been transferred as indicated with reference to the delta Y/delta X data stored in register 608 (decision block 808), then the instruction execution is complete (end block 811) and graphics processor 120 continues by executing the next instruction in its program. As noted, in the preferred embodiment this process illustrated in FIG. 8 is implemented in instruction microcode and the entire data transformation process, referred to as an array move, is performed in response to a single instruction to graphics processor 120.

FIG. 9 illustrates the structure of the preferred embodiment of the address register of central processing unit 200. Address register 900 includes two parts, bit address 901 and word address 902. In the preferred embodiment address register 900 includes 32 bits. These 32 bits are divided into the 4 bits for bit address 901 (bits 0 to 3) and 28 bits for word address 902 (bits 4 to 31). Bit address 901 is employed internal to graphics processor 120 in order to designate a field starting at any bit within the memory 130. In the preferred embodiment, memory 130 is organized into words of 16 bits each. The higher order bits of address register 900, comprising word address 902, are employed to select the particular word within memory 130.

In the preferred embodiment of the present invention, graphics processor 120 employs video memory bus 122 as a tri-multiplexed local address/data bus. During a first cycle a row address is generated on the local address/data bus. During a later column address strobe cycle a column address is instead generated on the same local address/data bus. Lastly, during a data cycle the data is either received on the local address/data bus, in the case of a read operation, or generated by the graphics processor 120 on this local address/data bus, in the case of a write operation.

FIG. 10 illustrates the relationship between the particular pins of the local address/data bus and the address bits generated during the two address cycles. FIG. 10 illustrates local address/data bus pins 1010 in which the individual bits of this bus are designated 0 to 15. FIG. 10 illustrates at 1020 the bits from address register 900 which are generated for corresponding pins of the local address/data bus during the row address strobe cycle. It can be seen from 1020 appearing in FIG. 10 that during the time of a row address strobe signal the address bits 12 to 27 from address register 900 are generated consecutively on local address/data bus pins 0 to 15. During the column address strobe cycle 1030 illustrates the bits of the address register 900 which are applied to local address/data bus pins. As can be seen at 1030, the address register bits 4 to 15 are generated consecutively on local address/data bus pins 0 to 11. Local address/data bus pin 12 has bit 28 from the address 900 and local address/data bus pin 13 has bit 29 from the address register 900. Bits 14 and 15 of the local address data bus pins output the inverted shift register transfer signal (TR-) and and the instruction acquisition signal (IAQ), respectively. The inverted shift register transfer signal is employed for control of data transfer within multiport video random access memories, such as the TMS4161 manufactured by Texas Instruments Incorporated. The use of this signal will be further described below. The instruction acquisition signal is employed in special cases when the instruction cache is disabled, or when the instruction cache does not contain the instruction corresponding to the desired address. It should be particularly noted that this technique provides an output of some of the bits from address register 900 during both of the address cycles though on different pins.

Figure 11:
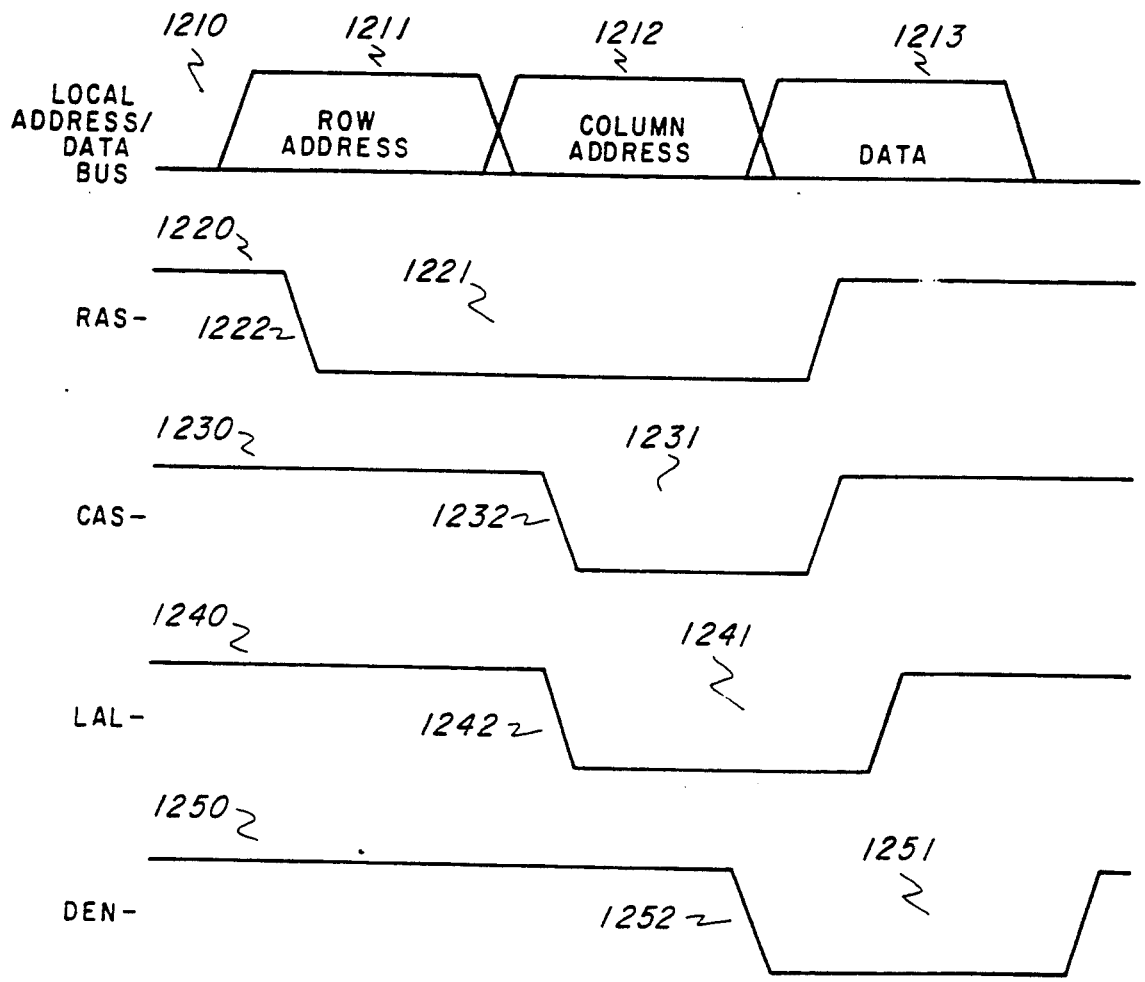
FIG. 11 is a timing diagram illustrating the various timing functions during operation of the memory.

FIG. 11 illustrates the timing of various signals for control of the DRAMs forming memory 130. These signals are generally provided using an inverted logic convention in which a low voltage corresponds to an active signal. The signals appearing on the local address data bus are illustrated at 1210. The signals on the local address data bus are multiplexed in three parts between the row address, the column address and the data. During an interval 1211 the row address appears on the local address data bus. This row address output corresponds to the bits 1020 illustrated in FIG. 10. During a later interval 1212 the column address is output. This output corresponds to 1030 illustrated in FIG. 10. Lastly, during a still later interval 1213, the data is generated or received by the local address data bus depending upon whether the memory cycle is a write cycle or a read cycle.

FIG. 11 further illustrates the inverted row address strobe signal 1220. During an interval 1221, this inverted row address strobe signal is low, indicating an active state. The leading edge 1222 of the row address strobe active signal 1220 indicates that the bits appearing on the local address data bus corresponds to the row address. Similarly, inverted column address strobe signal 1230 is active during an interval 1231. The leading edge 1232 of this active portion of the inverted column address strobe signal 1231 indicates when the column address appears on the local address data bus.

FIG. 11 illustrates inverted local address latch signal 1240 and inverted data enables signal 1250. Inverted local address latch signal 1240 includes an active interval 1241 having a leading edge 1242. The local address latch signal 1240 has its leading edge during the time that the column address is valid on local address data bus 1210. The use of a transparent latch circuit controlled by this local address latch signal permits the capture of the column address for storage until the local address latch becomes inactive. This signal is employed to enable storage of the column address for application to the DRAMs in the manner which will be more fully explained below. Inverted data enable signal 1250 has an active interval 1251 and a leading edge 1252. The inverted data enable signal 1250 has its leading edge during the interval at which the local address data bus generates data. As noted above this signal is used to control a transparent latch circuit to capture the data for retention until the data enable signal again becomes inactive. This signal enables this data to be latched for application to the DRAMs.

Figure 12:
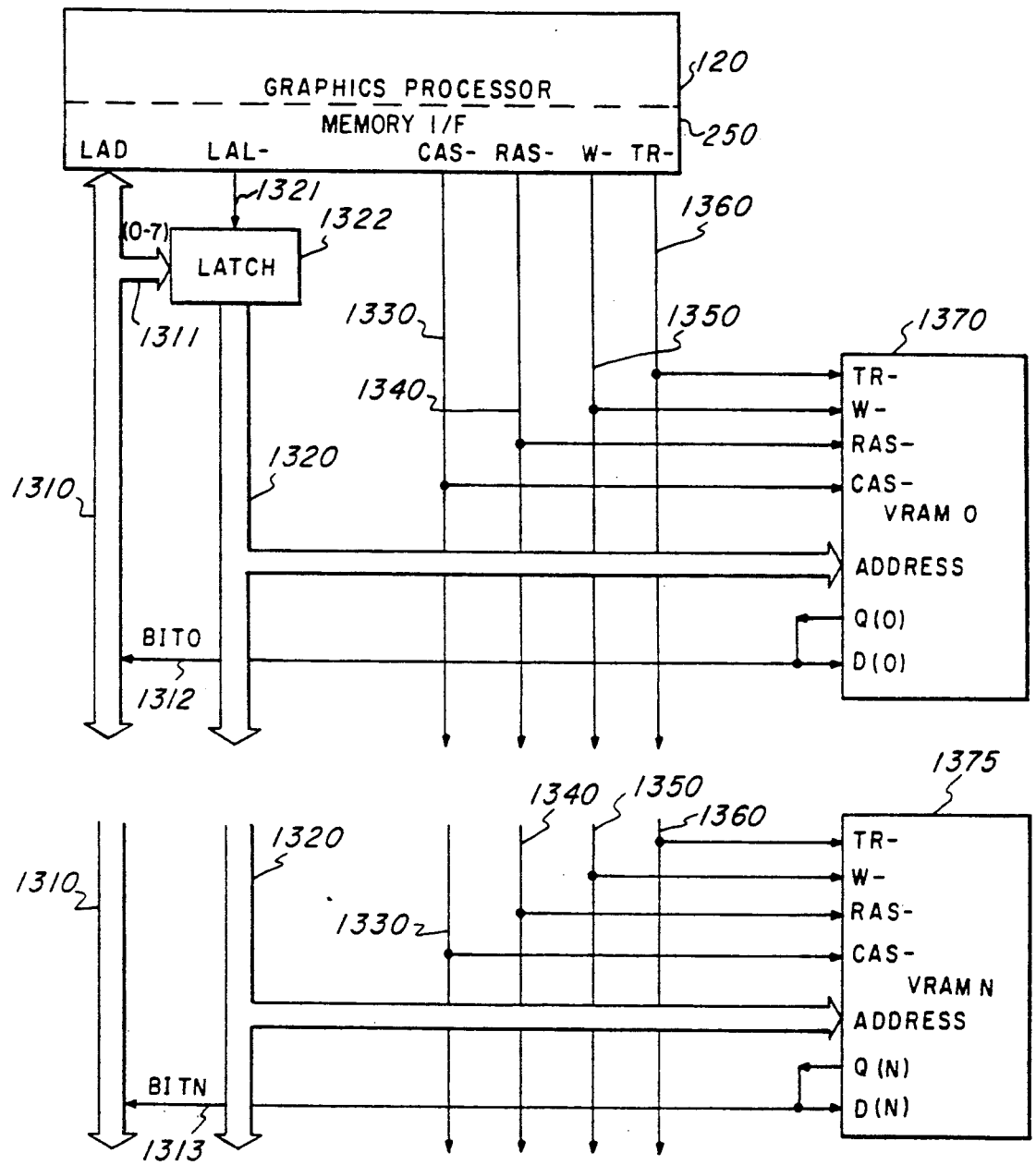
FIG. 12 is an illustration of the connection of the graphics processor to a single bank of memory.

FIG. 12 illustrates the connection of memory interface 250 of graphics processor 120 to a single bank of DRAMs. Memory interface 250 generates a set of signals including local address/data signal, inverted local address latch signal, inverted column address strobe signal, inverted row address strobe signal, inverted memory write signal and inverted shift register transfer/output signal. This set of signals are applied to the dynamic random access memories in the manner described below.

Memory interface 250 applies the local address data output to data bus 1310. Bus 1310 is applied to the memories in two ways. Firstly, a subbus 1311 corresponding to bits 0 to 7 of the local address data output is applied to the input of transparent latch 1322. The output of latch 1322 appears on address bus 1320 and is applied to the address input of each of the video random access memories illustrated symbolically as video RAM O 1370 and video RAM N 1375. These video random access memories are special dynamic random access memories adapted for use as bit map memories.

The transparent latch 1322 is controlled by the inverted local address latch signal. The inverted local address latch signal is applied to the enable input of transparent latch 1322 via line 1321. When the local address latch signal is inactive, transparent latch 1322 is transparent enabling the input on subbus 1311 to be applied directly to address bus 1320. When the local address latch signal on line 1321 becomes active the state of the input on subbus 1311 is captured and this state is output for as long as the local address latch signal is active regardless of any changes on subbus 1311. Referring to FIG. 11, it can be seen that the inverted local address latch is inactive during the interval 1211 when the local address/data bus generates the row address. Thus the row address appearing during interval 1211 is applied to the address inputs of each memory in the single bank of memories. Note that the local address latch signal becomes active at leading edge 1242 during the time that the column address is output on local address/data bus 1310. Thus the column address is held in transparent latch 1322 and output to address bus 1320 during the interval 1241 when the local address latch signal is active.

Local address/data bus is also connected to the data inputs and outputs of the memories. One bit of the local address data bus 1310 is applied to each of the memories. Bit O is bidirectionally coupled to local address data bus 1310 and to both the data input D(O) and the output Q(O) of video RAM 1370 via line 1312. Similarly, line 1313 is bidirectionally connected to local address data bus 1310 and to the data input D(N) and the data output Q(N) of video RAM N 1375. This representative Nth bit corresponds to the typical connection of other memories.

The other signals output from memory interface 250 serve to control the video RAMs. The inverted column address strobe signal appearing on line 1330 is applied to the column address strobe signal input of each of the memories. Similarly, the row address strobe signal on line 1340, the inverted write signal on line 1350 and the inverted transfer register signal on line 1360 is applied to each of the memories.

Figure 15:
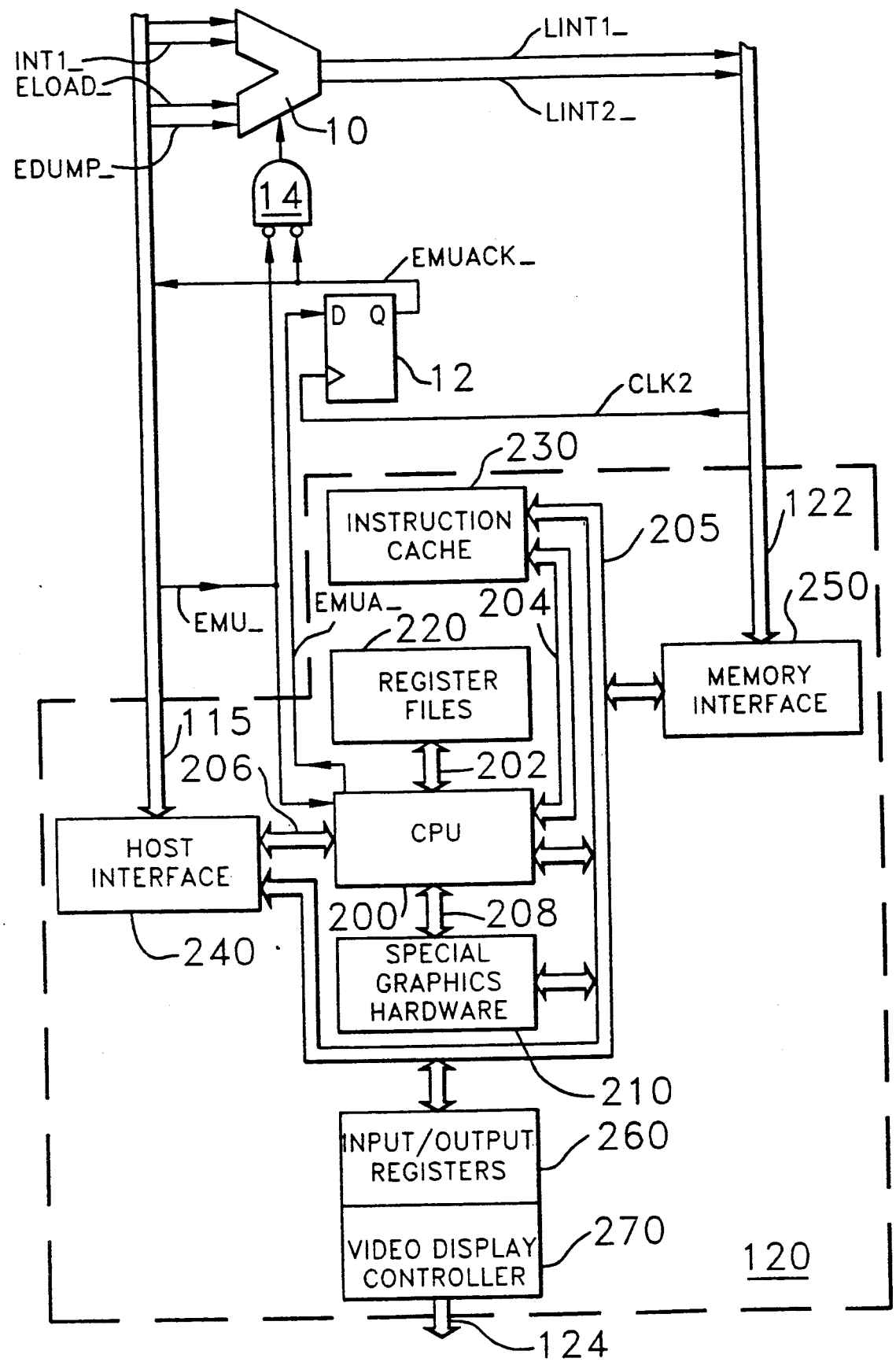
FIG. 15 is a block diagram illustrating the graphics processing apparatus of FIG. 2 in conjunction with additional hardware useful in the operation of the self-emulation mode.
Figure 16:
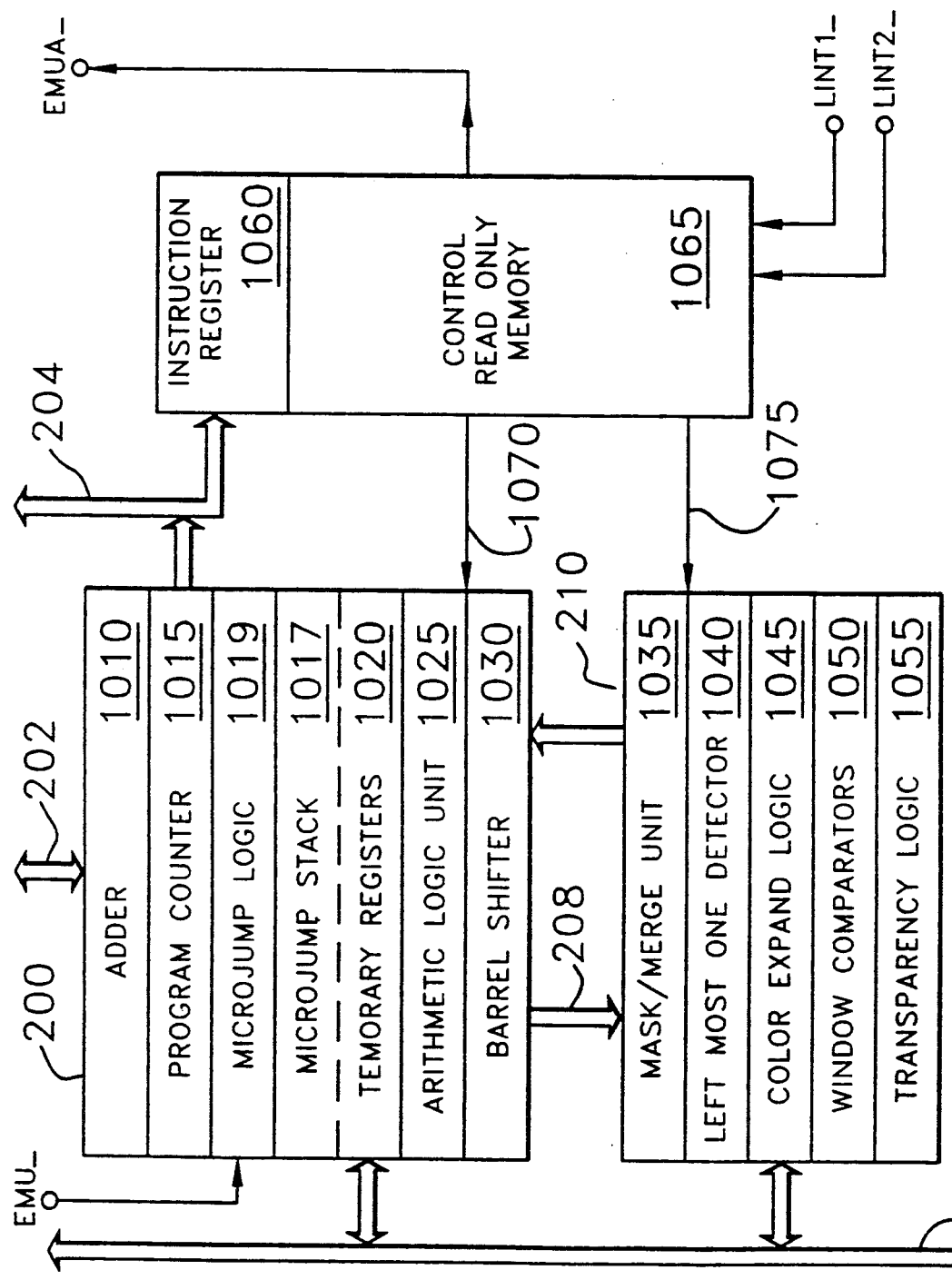
FIG. 16 is a block diagram illustrating the construction of the preferred embodiment of the graphics processing apparatus.

In the preferred embodiment of the present invention, the memories employed are multiport video random access memories such as the TMS4161 manufactured by Texas Instruments Incorporated. These memories permit two types of access. When employed in a parallel access mode these memories operate as normal 64K by 1 DRAMs having 256 rows and 256 columns. Access requires the transmission of an 8 bit row address and an 8 bit column address to access a single bit. These memories also include a serial access mode in which an internal 256 bit shift register can be loaded from one of the rows or can write to one of the rows. The particular row participating in this transfer is specified by a row address received on the address bus. This shift register may be independently loaded from a serial input port or read from a serial output port. This extra data port enables the serial video display access to the memory to be achieved without interference with the processor drawing into or reading from the bit map. The inverted transfer register signal from either bit 14 of the local address/data bus during the column address strobe cycle or the TR- output of the graphics processor 120 illustrated in FIGS. 15 and 16 is employed to control the transfer of data between the selected row and this internal shift register. The operation of the inverted transfer register signal will not be further described because it is not necessary to practice the present invention.

The system illustrated in FIG. 12 operates substantially as follows. During the row address strobe cycle a signal appears on line 1340 which is applied to each of the memories represented by video RAM O 1370 and video RAM N 1375. At this time the signal on the subbus 1311 corresponds to the row address signal such as illustrated at 1020. As noted above latch 1322 is transparent so this signal is applied to each address input via bus 1320. During a later time an inverted column address strobe signal is generated on line 1330 and applied to each of the memories. At the same time, local address data bus 1310 generates the column address on subbus 1311. This signal is captured by latch 1322 in accordance with local address latch signal 1321 and applied to address bus 1320. This address bus 1320 is applied to each of the memories, thereby specifying the column address within each memory. At a later portion of the cycle, when neither column address strobe signal 1330 nor row address strobe signal 1340 is active, data is exchanged between graphics processor 1220 and the memories. The direction of this transfer is specified by the inverted write signal appearing on line 1350. If a write operation is specified then graphics processor 120 generates signals on local address 1310 for application to the D inputs of the memories. If a read operation is specified then each of the memories generates an output signal on its Q output which is connected one of the bits of bus 1310 for application to graphics processor 120.

Figure 13:
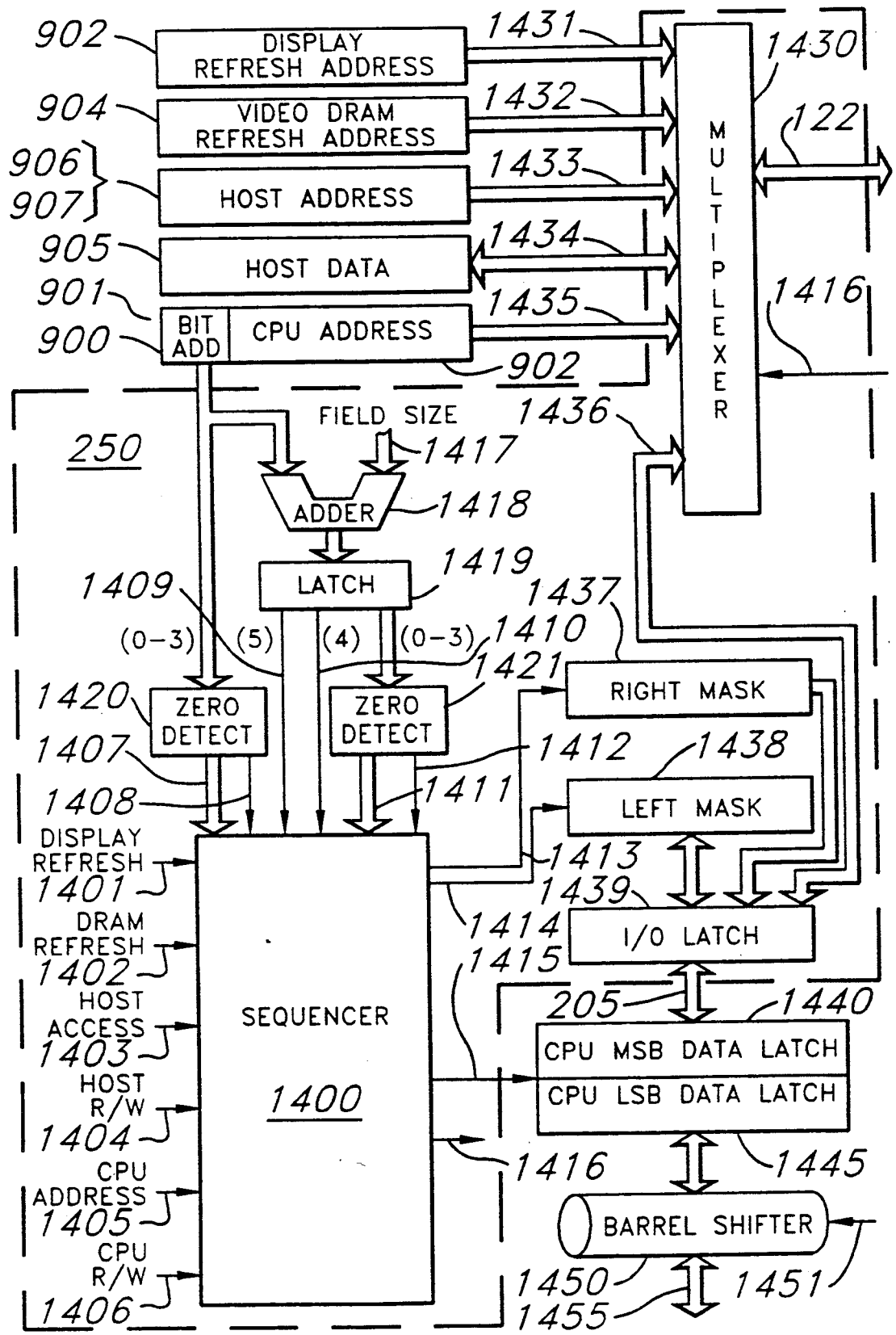
FIG. 13 is a block diagram illustrating the construction of the memory interface portion of the graphics processor of the present invention.

FIG. 13 illustrates hardware within memory interface 250 and other portions of graphics processor 120 which together enable the access to memory 130 in accordance with a set of priorities and further permit access to memory 130 via central processing until 200 in a specified sequence of addresses. FIG. 13 illustrates a plurality of registers, 902, 904, 906/907, and 905 which are a part of input/output registers 260. FIG. 13 further illustrates central processing unit address register 900, described above. Each of these registers is connected to memory interface 250 for connection to bus 122. Also connected to memory interface 250 is a data latch including central processing unit most significant bits data latch 1440 and central processing unit least significant bits data latch 1445.

Control of the operation of memory interface 250 is via sequencer 1400. Sequencer 1400 receives various input control and data signals. The control signals include display refresh request appearing at input 1401, DRAM refresh request appearing at line 1402, host access request appearing at line 1403, host read/write control appearing at line 1404, central processing unit access request at line 1405 and central processing unit read/write control at line 1406.

Sequencer 1400 receives data signals from several sources. Firstly, the bit address 901 from central processing unit address register 900 is applied to zero detector 1420. The bits of the bit address 901 are applied to sequencer 1400 via lines 1407. A zero detection signal from zero detector 1420 is applied to sequencer 1400 via line 1408. The bit address from bit address register 901 is also applied to an adder 1418. Adder 1418 also receives the field size from bus 1417, which is stored in a status register in CPU 200. The output of adder 1418 is a 6 bit quantity which is stored within latch 1419. The 4 least significant bits (labeled bits 0 to 3) are applied to zero detector 1421. These 4 least significant bits are applied to sequencer 1400 via bus 1411. A zero indication signal is applied to sequencer 1400 via line 1412. The 2 most significant bits of latch 1419 (here designated as bits 5 and 4) are applied sequencer via lines 1409 and 1410, respectively. Sequencer 1400 generates outputs 1413, 1414, 1415 and 1416. The structures these outputs control will be discussed below.

Multiplexer 1430 controls the particular data applied to the memory bus 122. Multiplexer 1430 is coupled to register 902 receiving the display refresh address on bus 1431. Multiplexer 1430 is connected to register 904 receiving the video RAM refresh address on bus 1432. Multiplexer 1430 likewise receives the combined host address from registers 906 and 907 on bus 1433. Register 905 containing the host data is bidirectionally coupled to multiplexer 1430 via bus 1434. The word address portion 1202 of the central processing unit address register 1200 is applied to multiplexer 1430 via bus 1435. Bus 1436 bidirectionally couples multiplexer 1430 to input output latch 1439 and hence via bus 205 to central processing unit 200. Right mask 1437 is controlled from sequencer 1400 via line 1413. Likewise, left mask 1438 is controlled by sequencer 1400 via lines 1414. Right mask 1437 serves to mask the least significant bit portions of data from multiplexer 1430 applied via bus 1436 to input output latch 1439, in the event that the least order bits of the data word stored in memory 130 are not to be altered by the write access. Similarly, left mask 1438 serves to mask the most significant bits of this data transfer.

Central processing unit 200 includes central processing unit most significant bits data latch 1440 and central processing unit least significant bits data latch 1445 which are bidirectionally connected to input/output latch 1439 via bus 205. Line 1415 from sequencer 1400 determines whether the data transfer occurs from the most significant bits 1440 or the least significant bits 1445. Since central processing unit 200 operates on thirty-two bit data words, and since bus 205 accordingly is a thirty-two bit bus, most significant bits data latch 1440 and least significant data bits latch 1445 store the internal 32-bit data word in two 16-bit halves, so that the internal 32-bit data word is communicated to memory 130 as two 16-bit data words. Central processing unit 200 further includes thirty-two bit barrel shifter 1450 which is bidirectionally coupled to the two portions of central processing unit data latch 1440 and 1445. Barrel shifter 1450 serves to shift the data received from the combined central processing unit most significant bits data latch 1440 and central processing unit least significant bits data latch 1445 in the manner specified by central processing unit 200. Barrel shifter 1450 is controlled by field sign/zero extend control 1451 to shift data according to whether the field is sign extended or zero extended. Barrel shifter 1450 is coupled to other portions of central processing unit 200 via bus 1455.

The general operation of the memory controller 250 will now be described in conjunction with FIG. 13. Depending upon the particular control and data signals received by sequencer 1400, sequencer 1400 selects one source applied to multiplexer 1430 for application to the memory 130 via bus 122. Thus, for example, sequencer 1400 may cause multiplexer 1400 to couple the display refresh address stored in register 902 to the memory in response to a display refresh request on line 1401. Similarly, a DRAM refresh request on line 1402 causes sequencer 1400 to control multiplexer 1430 to apply the video RAM refresh address stored in register 904 to memory 132. A host access request appearing on line 1403 together with the host read/write control appearing on line 1404 enables sequencer 1400 to control multiplexer 1430 to apply the host address stored in the combined register 906 and 907 to memory 130 via bus 122 and further to exchange data between the memory and register 905 in accordance with the selected operation. Lastly, a central processing unit access request on line 1405 together with the central processing unit read/write control appearing on line 1406 enables sequencer 1400 to couple the central processing unit word address stored in subpart 1202 of central processing unit address register 1200 to memory 130 via multiplexer 1430. Then, in accordance with the read or write operation selected by central processing unit read/write control appearing at input 1406, data is exchanged between memory 130 and the central processing unit via bus 1436. In the case of a write operation (from CPU 200 to memory 130), this data may be masked by the right mask 1437 and left mask 1438 responsive to control signals from sequencer 1400 via control lines 1413 and 1414, respectively. This data is then exchanged with data from the central processing unit least significant bits data latch 1445 or central processing unit most significant bits data latch 1440, depending upon the appropriate half of the 32-bit internal data word.

Figure 14:
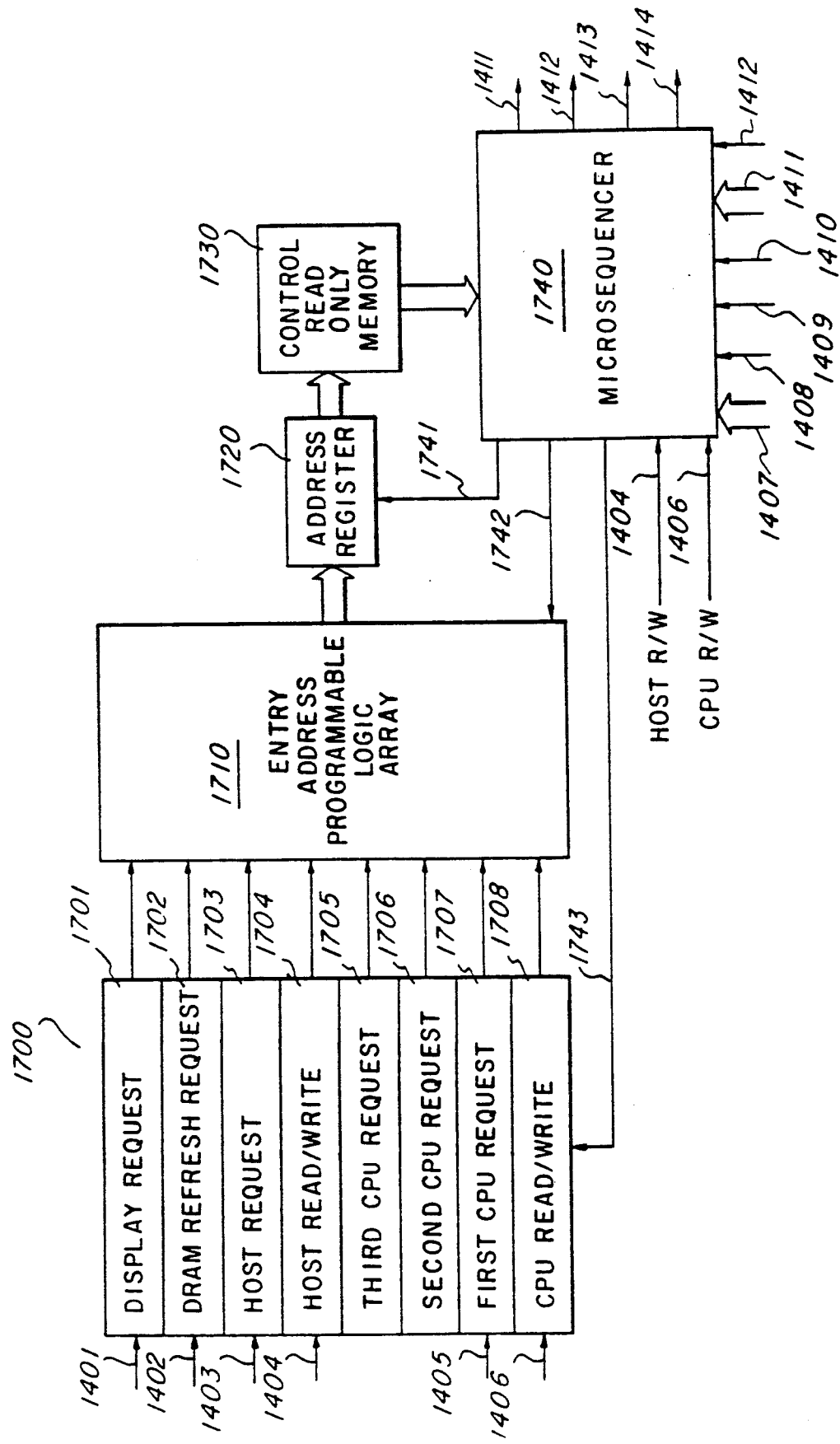
FIG. 14 is a block diagram of the sequencer in the memory interface portion of the graphics processor of the present invention.

FIG. 14 is a more detailed block diagram of sequencer 1400. Sequencer 1400 includes a set of latches 1700, entry address programmable logic array 1710, address register 1720, control read only memory 1730 and microsequencer 1740. The various requests signals are applied to individual latches within the set of latches 1700. The signals at these latches are applied to entry address programmable logic array 1710 which generates an entry address for application to control read only memory 1730. This derived entry address is stored in address register 1720. Once this entry address is generated, control read only memory 1730 controls the operation of microsequencer 1740 for generation of the various output signals of sequencer 1400.

Latches 1700 includes a set of latches for storing various request and control signals applied to sequencer 1400. Latches 1700 include display request latch 1701, which receives the display refresh signal. DRAM refresh request latch 1702 receives the DRAM refresh request signal on line 1400. Host request latch 1703 receives the host request signal on line 1403. Host read/write control latch 1704 receives the host read/write control signal on line 1404. First central processing unit request latch 1707 receives the central processing unit request signal on line 1405, indicating that a memory access, and associated read or write operation, is requested by CPU 200. This will result in a read or write operation associated with the least significant sixteen bits of the 32-bit internal data word, as discussed above. Second central processing unit request latch 1706 is set by microsequencer 1740, to indicate that a read or write operation for the most significant sixteen bits of the internal data word is necessary. Likewise, third central processing unit request latch 1705 is set by microsequencer 1740 via control lines 1743, and indicates if an memory operation is desired for a bit address outside of the thirty-two bit data word corresponding to the address value stored in address register 900. These three CPU request latches allow the desired field to exceed the boundaries of the sixteen-bit halves of the 32-bit internal data word, and the boundary of the 32-bit internal data word itself, as described in detail in co-pending application Ser. No. 821,634, filed Jan. 23, 1986. Lastly, central processing unit read/write control latch 1708 receives the central read/write control signal on line 1406, indicating whether graphics processor 120 reads data from, or writes data to, memory 130.

Entry address programmable logic array 1710 receives a signal from each of the latches 1700. In addition, entry address programmable logic array 1710 receives a control signal 1742 from microsequencer 1740. This control signal chiefly indicates whether or not microsequencer 1740 is engaged in servicing a current memory access request. These signals applied to entry address programmable logic array 1710 specify an entry point within control read only memory 1730. This address is stored in address register 1720.

Address register 1720, control read only memory 1730 and microsequencer 1740 constitute a programmable controller. The entry points selected by entry point programmable logic array 1710 within control read only memory 1730 are the beginnings of subroutines for servicing the corresponding memory access request. The instructions of these subroutines stored within control read only memory 1730 are applied sequentially to microsequencer 1740 which performs various output operations in accordance with this instruction on lines 1413, 1414, 1415 and 1416. In this regard an increment signal is applied to address register 1720 via line 1741 from microsequencer 1740, each time an ordinary instruction has been executed in order to enable the recall of the next sequential instruction. In addition to the outputs named above, microsequencer 1740 generates control outputs on lines 1743 to latches 1700. This control output is concerned with the setting and resetting of various latches within latches 1700. Lastly, microsequencer 1740 also receives the host read write control signal on line 1404 and the central processing unit read write control signal on line 1406.

Referring now to FIG. 15, the block diagram of FIG. 2 is shown incorporating additional hardware, and identifying the essential signals, necessary in this embodiment to perform emulation tasks useful in the development of software programs containing sequences of instructions for graphics processor 120. Host bus 115 includes certain lines dedicated to the emulation function. A first of these lines is emulate enable line EMU— (the "—" designating negative logic, or active low, for the signal carried by said line), upon which host processor 110 can generate a signal to begin the emulation routine. Lines EDUMP— and ELOAD— also controlled by host processor 110 to in turn control whether the contents of registers within graphics processor 120 will be written to or read from a memory subsystem accessible via video memory bus 122, such as video RAM 132. It should be noted that in this embodiment the EDUMP_ and ELOAD_ lines are connected to inputs of multiplexer 10, as are interrupt lines INT1_ and INT2_ of host bus 115. The two outputs of multiplexer 10 are connected to interrupt request lines LINT1_ and LINT2_ of local memory bus 122. During such time as emulation is not enabled, multiplexer 10 connects interrupt request lines LINT1_ and LINT2_ of video memory bus 122 to the lines of host bus 115 corresponding to interrupt signals INT1_ and INT2_.

As will be discussed in further detail below relative to FIG. 16, CPU 200 generates an active signal on line EMUA_ responsive to CPU 200 receiving an active signal on line EMU_. Line EMUA_ is connected to the D input of D-type latch 12, which is clocked by clock signals on line CLK2 of video memory bus 122. Graphics processor 120 generates clock signals on line CLK2 of video memory bus 122, and on line CLK1 of video memory bus 122 (not shown), responsive to an input clock signal received on line INCLK of video memory bus 122. The generated clock signals on lines CLK1 and CLK2 are 90 degrees out of phase relative to each other, which allows external devices such as video memory 130 to synchronize with any one of four clock phases of the machine cycle of graphics processor 120. The output of latch 12 constitutes line EMUACK_ of host bus 115. In addition, line EMUACK_ (inverted) is connected to an input of AND gate 14, which has its other input connected to emulate enable line EMU_ of host bus 115 (also inverted). The output of AND gate 14 is connected to multiplexer 10, to select between the connection of interrupt signals INT1_ and INT2_ or emulation signals EDUMP_ and ELOAD_ to interrupt lines LINT1_ and LINT2_ of video memory bus 122, depending upon the selection of normal run mode or emulation mode, respectively.

It will become apparent from FIG. 15, based on the description of the operation of the emulation mode of graphics processor 120 hereinbelow, that the user need only add multiplexer 10, latch 12, and AND gate 14 to the system of FIG. 1 in order to take advantage of the self-emulation capabilities of graphics processor 120 described herein. For sake of example, the description below will use a portion of video RAM 132 which is not utilized in the bit-mapped display as the memory locations to which (and from which) the contents of internal registers will be dumped (or loaded). However, a dedicated read/write memory subsystem which is addressable by way of video memory bus 122 can be utilized for the emulation purpose, as well. Whether a non-bit-mapped region of video RAM 132 or a separate dedicated memory is used, it is essential that the memory used for the emulation function be addressable by host processor 110, so that the contents of the memory locations used in the emulation can be interrogated and/or modified. This may require connection between host processor 110 and video memory bus 122, or a separate bus 116 as described above relative to FIG. 1.

FIG. 16 illustrates in somewhat greater detail the structure and interrelationship between central processing unit 200 and special graphics hardware 210. As previously illustrated in FIGS. 2 and 13, central processing unit 200 and special graphics hardware 210 are bidirectionally coupled via bus 208. Central processing unit 200 and special graphics hardware 210 are bidirectionally coupled to major bus 205. In addition, FIG. 16 illustrates central processing unit 200 connected to bus 202 which is further coupled to the register files 220 and to bus 204 which is further coupled to instruction cache 230.

FIG. 16 illustrates that central processing unit 200 includes adder 1010, program counter 1015, temporary registers 1020, arithmetic logic unit 1025, microjump logic 1019, and barrel shifter 1030. One of the temporary registers 1020 serves as microjump stack 1017, separately shown in FIG. 16. Temporary registers 1070 shown in FIG. 16 also include address register 900, discussed above. These elements are conventional in character, corresponding to elements employed in central processing units known in the prior art, with the exception of microjump logic 1019; microjump logic 1019 may be constructed by any one of a number of logic realizations capable of performing its function described hereinbelow.

FIG. 16 illustrates various subparts of special graphics hardware 210. Special graphics hardware 210 includes mask/merge unit 1035, left most one detector 1040, color expand logic 1045, window comparators 1050 and transparency logic 1055. These individual portions of special graphics hardware 210 are particularly adapted for manipulation of pixel information within video random access memory 132.

FIG. 16 also illustrates instruction register 1060 and control read only memory 1065. Instruction register 1060 receives an instruction from instruction cache 230 via bus 204. The particular instruction recalled for storage in instruction register 1060 is specified by the address stored in program counter 1015. Whether this instruction must be recalled from memory 130 via memory interface 250 or it is already stored within instruction cache 230, this instruction is stored in the instruction register 1060. The instruction stored in instruction register 1060 activates control read only memory 1065 to output a plurality of control signals corresponding to the particular instruction being executed. Thus control read only memory 1065 performs the function of an instruction decoder. The control signals are applied to central processing unit 200 via control bus 1070 and to special graphics hardware 210 via control bus 1075. It is contemplated that some instructions which may be stored in instruction register 1060 for implementation via control read only memory 1065 may require only some of the resources of central processing unit 200 or special graphics hardware 210. However, no distinction is made in the instruction itself or in the control signals stored within control read only memory 1065. In any case of an instruction being received by graphics processor 120, it is loaded into instruction register 1060 for implementation via control signals on control buses 1070 and 1075 derived from control read only memory 1065. It is contemplated that in some cases cooperation between central processing unit 200 and special graphics hardware 210 will be required in order to implement a single instruction. This is to be expected in the same manner in which several portions of central processing unit 200 would ordinarily be required to implement any instruction directed solely to the resources of central processing unit 200.

Microjump logic 1019 contains logic required to load program counter 1015 with a predetermined address. As shown in FIG. 16, the emulate enable line EMU_ is connected to microjump logic 1019. Upon receiving the active signal on emulate enable line EMU_, microjump logic 1019 first loads microjump stack 1017 with the contents of program counter 1015, so that execution can begin from the same point in the sequence of instructions after completion of the emulation routine. After the contents of program counter 1015 are saved in microjump stack 1017, microjump logic 1019 will load program counter 1015 with a predetermined address value, or vector, corresponding to the location of the instructions which control the emulation, or internal register dump/load operations which will be further described below. Just as in the case of any other instruction, the instruction code located at the program memory address stored in program counter 1015, i.e., the instruction at the predetermined vector corresponding to the emulation routine, will be loaded into instruction register 1060. The instruction code in instruction register 1060 will be decoded by control ROM 1065 to control the execution of the instruction by CPU 200 and special graphics hardware 210. In addition, a dedicated line out of control ROM 1065 is the acknowledge line EMUA_; responsive to the decoding of the initial instruction in the emulation routine, control ROM 1065 will put acknowledge line EMUA_ into its low, active, state.

It should be noted that the function of microjump logic 1019 and microjump stack 1017 may be performed by well-known techniques for interrupt signal receipt and handling, or by using a general-purpose stack as is used in many microcomputers for subroutine calls and the saving of addresses during interrupt handling routines.

Upon the decoding of the initial instruction in the emulation sequence, control ROM 1065 will examine the state of local interrupt lines LINT1_ and LINT2_ to determine whether a dump or a load sequence is to be executed in emulation mode. As will be discussed below, if neither (or both) of the lines LINT1_ or LINT2_ are active, control ROM 1065 will continue to execute the first instruction, in effect waiting for either one or the other of the lines LINT1_ and LINT2_ to become active. Upon receiving one or the other of the active states on lines LINT1_ or LINT2_, control ROM 1065 will cause program counter 1015 to be loaded with the address of the instruction in either the dump or load sequences, respectively. Once in execution of one of the sequences, control ROM 1065 will cause CPU 200 to load the contents of addresses for successive instructions into program counter 1015, for the fetching of the corresponding instructions in the emulation routine into instruction register 1060, until completion of the routine.

Upon decoding the last instruction of the emulation routine called via the active signal on lines LINT1_ or LINT2_, control ROM 1065 will direct microjump logic 1019 to load the contents of microjump stack 1017 into program counter 1015. This will cause the next instruction to be decoded and executed by control ROM 1065 to be the instruction which was next to be executed in the sequence during which the emulation routine was called by the active signal on emulate enable line EMU_. Control ROM 1065 will also generate an active pulse on line EMUA_ at this time, signifying the completion of the load or dump sequence. Execution of the prior instruction sequence can then continue.

It should be noted that microjump logic 1019 can be constructed by any of a number of logic realizations which are well known in the art, given the above description of the function of microjump logic 1019, and its interconnection with microjump stack 1017, program counter 1015, and emulate enable line EMU_.

Figure 17A:
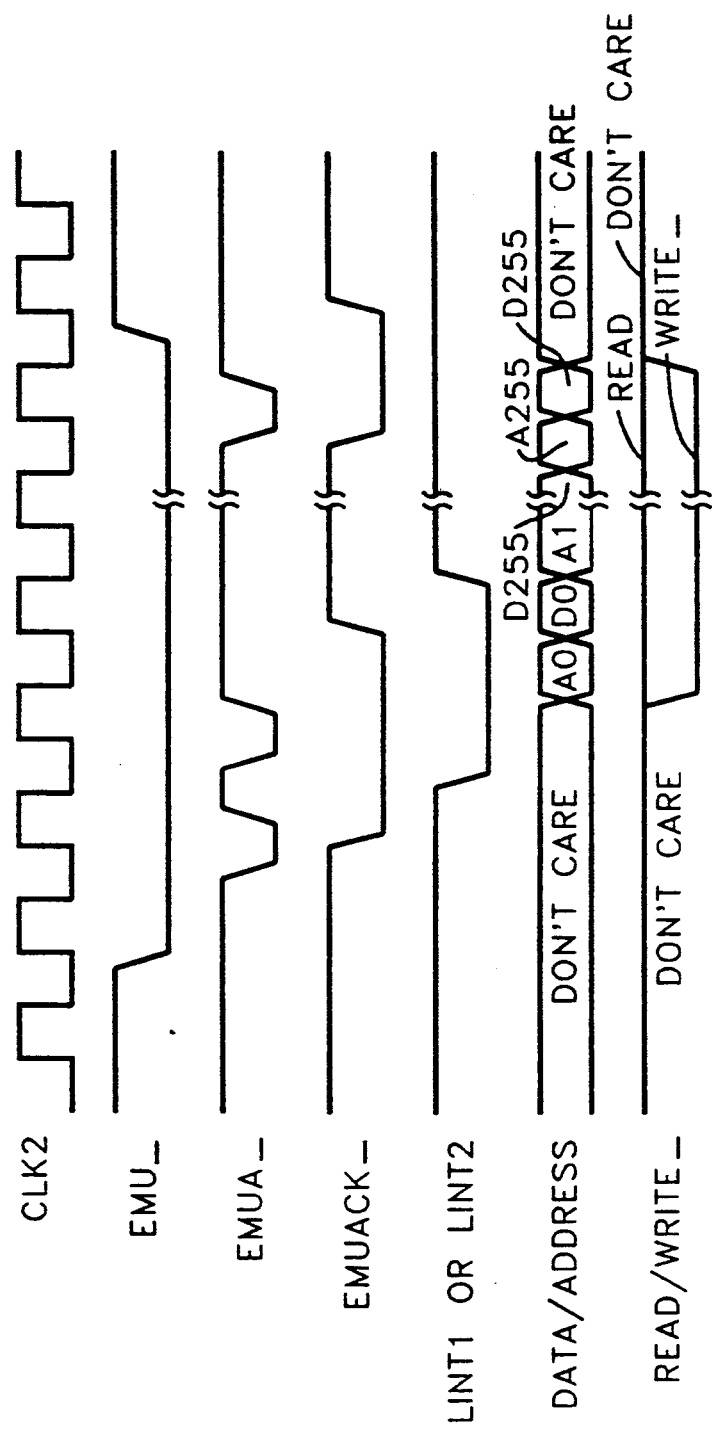
FIGS. 17a and 17b are timing diagrams illustrating the operation of the emulation mode of the preferred embodiment of the graphics processing apparatus.
Figure 17B:
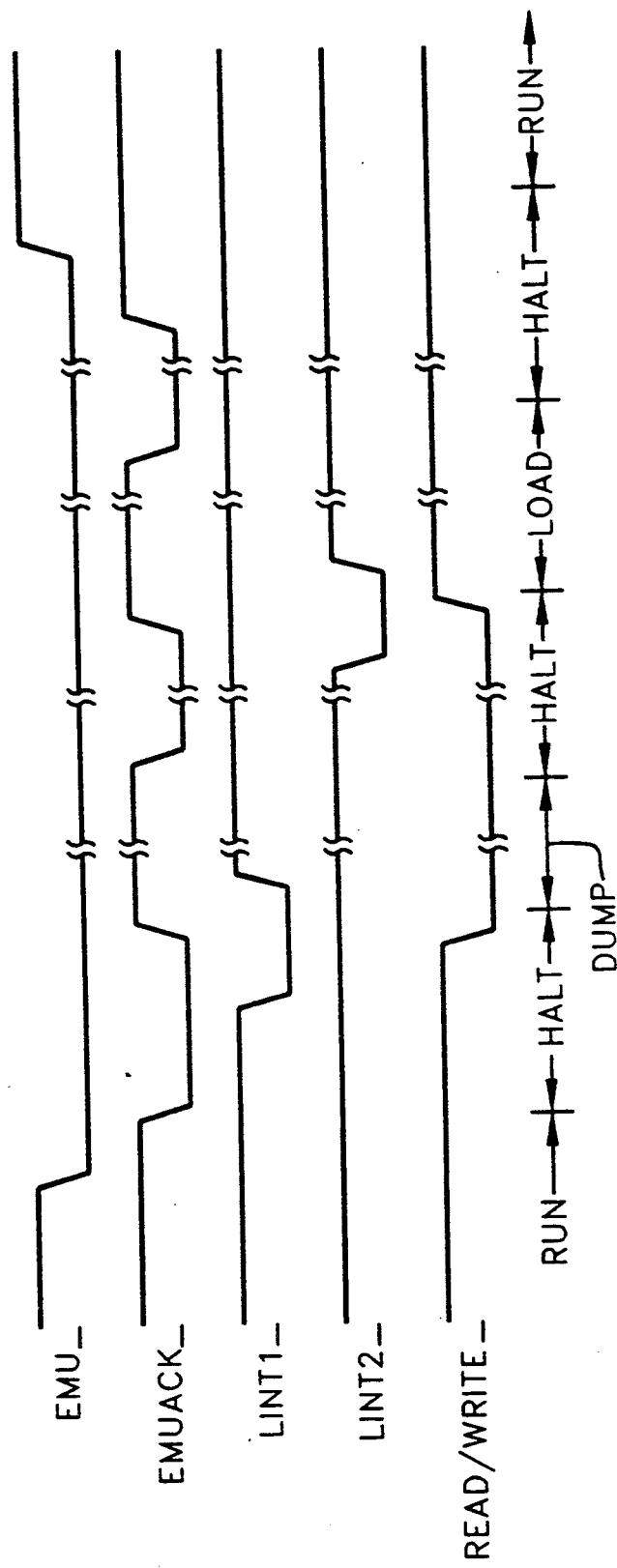

Referring now to FIGS. 17a and 17b, the timing and operation of the self-emulation of graphics processor 120 will be described. In FIG. 17a, the top line illustrates the timing of the system clock signal provided as described above on line CLK2. Each cycle of the signal on line CLK2 indicates a machine cycle for the graphics processor 120. The signal on emulate enable line EMU_ is shown in FIG. 17a as going to its low active state during a machine cycle; as discussed above, the signal on emulate enable line EMU_ can be provided by host processor 110 via host bus 115. In the next machine cycle after receipt of the active signal on emulate enable line EMU_, control ROM 1065 generates a low active signal on acknowledge line EMUA_. It should be noted that, as discussed above relative to FIG. 16, control ROM 1065 generates the active signal on line EMUA_ as it decodes the instruction located at the predetermined vector for the emulation routine; accordingly, this requires the completion of the execution of the instruction which was in instruction register 1060 prior to the first instruction in the emulation routine. If this prior instruction is a multiple-cycle instruction, it should be noted that control ROM 1065 would not generate the active signal on acknowledge line EMUA_ until the machine cycle after completion of the multi-cycle instruction. For purposes of explanation, FIG. 17a shows that this prior instruction is completed in the machine cycle in which emulate enable line EMU_ receives the active low signal.

After control ROM 1065 causes acknowledge line EMUA_ to go to its low state, the following low-to-high transition of the clock signal on line CLK2 will cause latch 12 to drive line EMUACK_ to a low state. Since the signals on both lines EMU_ and EMUACK_ are low, the output of AND gate 14 will be in its high state, causing multiplexer 10 to connect the signals on lines ELOAD_ and EDUMP_ to lines LINT1_ and LINT2_ of video memory bus 122. Host processor 110 can then decide, via lines EDUMP_ or ELOAD_ of host bus 115, whether the contents of register file 220 and registers from instruction cache 230, as well as other internal memory locations as desired, are to be dumped to video memory bus 122 for storage in the non-bit-mapped portion of video RAM 132, or to be loaded into register file 220 or registers from instruction cache 230 from video RAM 132. In order to perform the dump operation, line EDUMP_ must be taken to its low active state during such time as line ELOAD_ is in its high inactive state, and conversely in order to perform the load operation, line ELOAD$_{13}$ must be taken to its low active state while line EDUMP_ is in its high inactive state. These signals appear on lines LINT1_ and LINT2_ of video memory bus 122, as shown in FIG. 17a, in the machine cycle after line EMUACK_ goes active. After receipt of an active signal on one of the local interrupt lines LINT1_ or LINT2_, control ROM 1065 will cause the signal on acknowledge line EMUA_ to go to a high state, which will, on the next machine cycle, cause the signal on the line EMUACK_ to also go to a high state. The emulation routine will continue to its completion from this time, so long as line EMU_ remains low.

The execution of both the dump and the load routines in the emulation mode, subsequent to receipt of active signals on one of the other of local interrupt lines LINT1_ and LINT2_, includes the loading of a series of address values into address register 900 by central processing unit 200. Central processing unit 200 will, for each of the address values, generate a memory access request signal to memory interface 250 via line 1405 (see FIGS. 13 and 14). Memory interface 250 will then generate a series of address signals on the memory address lines of video memory bus 122, shown on the line "DATA/ADDRESS" of FIG. 17a, corresponding to the series of address values loaded into address register 900 by central processing unit 200. The series of addresses begins with the first address in video RAM 132 ("A0") to which data is to be written from register file 220 and registers in instruction cache 230, or from which data is to be loaded into register file 220 and registers in instruction cache 230, and continues in a sequence of 256 such words in this particular embodiment (to address "A255"). Table 1 contains a list of the registers to and from which the emulation routine can write and read, respectively, and their respective place in the addressing sequence.

TABLE 1

| Hexadecimal Address | Register Description |
|---|---|
| 000–001 | Program counter 1015 |
| 002–003 | Status register |
| 004–023 | General purpose registers from register file 220 |
| 024–043 | Registers 601–611 and other registers from register file 220 |
| 044–630 | Input/output registers 260 |
| 064–083 | Subsegment registers 232a–232h for segment 231a |
| 084–0A3 | Subsegment registers 232a–232h for segment 231b |
| 0A4–0C3 | Subsegment registers 232a–232h for segment 231c |
| 0C4–0E3 | Subsegment registers 232a–232h for segment 231d |
| 0E4–0E5 | Segment start address register 231a |
| 0E6–0E7 | Segment start address register 231b |
| 0E8–0E9 | Segment start address register 231c |
| 0EA–0EB | Segment start address register 231d |
| 0EC–0ED | P flags for segments 231a through 231d |
| 0EE | Least-recently-used register (instruction cache 230) |
| 0EF–0FF | Reserved |

With respect to the presentation or receipt of data, such data is dependent upon the operation requested by host processor 110. As discussed above, video memory bus 122 has multiplexed data and address signals traveling over the same physical lines. If host processor 110 requests a dump cycle, of course, line EDUMP_ of host bus 115 will be active, causing line LINT1_ to be active, which will cause memory interface 250 to place onto video memory bus 122, during the data portion of the multiplexing, the contents of the registers specified in Table 1. Referring to FIGS. 2 and 13, the contents of the registers in instruction cache 230 are communicated to memory interface 250 by way of bus 205, not passing through CPU 200. Referring to FIG. 16, the contents of the registers in register file 220 are communicated to memory interface 250 via bus 202 and bus 205, but do not have to be loaded into, or operated on, by arithmetic logic unit 1025 of CPU 200. Memory interface 250 will further cause control lines within video memory bus 122 to enable video RAM 132 to receive and store the data presented on video memory bus 122 by memory interface 250, as discussed above. Included in these control signals is a read/write_ line, which presents a read signal to video memory 132 in its high logic state, and which presents a write signal to video memory 132 in its low logic state. This is shown in FIG. 17a by the line READ/WRITE_; its logic state will of course depend upon whether interrupt line LINT1_ or LINT2_ is active in its low state. Conversely, if host processor 110 requests a load cycle, line ELOAD_ of host bus 115 will be active, causing line LINT2_ to be active, which will in turn cause memory interface 250 to control video RAM 132 so that the contents of the memory locations corresponding to the address sequence of Table 1 are placed on video memory bus 122 during the data portion of the multiplexing cycle. In this manner, register file 220 and registers from instruction cache 230 can be loaded with the data received from video RAM 132 according to the sequence of Table 1, using the same internal buses as in the dump routine. The presentation of address and data information on the lines of video memory bus 122 is illustrated by the designation of "An" and "Dn" (n being the decimal number in the sequence of Table 1) shown in FIG. 17a. The multiplexing of the row and column addresses occurs as discussed above, but is not illustrated in FIG. 17a for purposes of clarity.

At the end of the sequence of addresses generated in the emulation routine, no further addresses related to emulation are generated on the address lines of video memory bus 122. To signal to host processor 110 that the dump or load routine has completed for the 256 locations, control ROM 1065 generates an active state on line EMUA_, which generates an active state on line EMUACK_ upon the end of the next machine cycle. This active pulse on the signals completion of the routine. As discussed above, the contents of microjump stack 1017 are then loaded into program counter 1015, for fetching and execution of the instruction which was next to have been executed prior to the emulation routine.

As a result of a dump operation performed as discussed relative to FIG. 17a, the contents of the register file 220 and registers from instruction cache 230, as shown in Table 1, can be examined after the execution of a given instruction as desired, or indeed may be examined after the execution of each instruction in a given sequence of instructions. In addition, the contents of register file 220 and registers from instruction cache 230 may be modified after being read from video RAM 132, or may be loaded with predetermined contents, prior to the execution of another instruction, or sequence of instructions, by graphics processor 120; subsequent to such execution, another dump routine may be performed for analysis of the instruction or instruction sequence.

Referring now to FIG. 17b, an emulation routine sequence consisting of a dump followed by a load, is illustrated in timing diagram form, with the clock signals on line CLK2 and the address and data signals on video memory bus 122 implied in FIG. 17b. To begin the emulation, the signal on emulate enable line EMU_ goes to a low active state. In response, control ROM 1065 generates an active signal on acknowledge line EMUA_ (also implied in FIG. 17b), which in turn drives the output of latch 12 to a low active state on line EMUACK_. At this time, the execution of graphics processor 120 goes from its "RUN" mode to a "HALT" mode, as indicated in FIG. 17b, and awaits a signal on one of local interrupt lines LINT1_ or LINT2_. Responsive to host processor 110 generating an EDUMP_ signal, and since the signals on both of lines EMU_ and EMUACK_ are low (causing multiplexer 10 to select the EDUMP_ and ELOAD_ signals to be connected to lines LINT1_ and LINT2_), the dump routine will begin execution, as discussed above. Illustrated in FIG. 17b is READ/WRITE_ signal in video memory bus 122 which, during the dump routine, is at its low logic level. The time duration of the dump routine is illustrated by the time period labeled DUMP in FIG. 17b.

At the end of the dump routine, as discussed above, control ROM 1065 generates an active signal on line EMUA— which in turn drives a low state at the output of latch 12 and on line EMUACK—. Once host processor 110 knows that the dump is complete, host processor 110 may interrogate video RAM 132 to read the contents of the register file 220 and registers in instruction cache 230 at the end of the last instruction executed in the RUN mode. Host processor 110 may then, after such interrogation or in spite of the results of such interrogation, load the locations in video RAM 132 corresponding to the register file 220 or registers in instruction cache 230 with such predetermined values as desired. Host processor 110 then can generate an active pulse on line ELOAD— during such time as line EMUACK— has an active signal, so that the load cycle can begin, as illustrated in FIG. 17b. During this sequence, indicated by "LOAD" in FIG. 17b, the signal in video memory bus 122 controlling the read and write operations of video RAM 132 will be at its high logic level, as illustrated by the line READ/WRITE$_{13}$ in FIG. 17b.

As discussed above, at the end of the loading of the 256 locations from video RAM 132, control ROM 1065 will again drive line EMUA— to its active low state, which appears at the output of latch 12 on line EMUACK—, signifying completion of the load portion of the routine. Host processor 110 then can place graphics processor 120 back in RUN mode, by taking emulate enable signal EMU— it its high inactive state. It should be noted that if the signal on emulate enable line EMU— is taken to its high state at any time during the emulation routine, the emulation load, dump or wait will be terminated, and graphics processor 120 will again return to its RUN mode.

Figure 18:
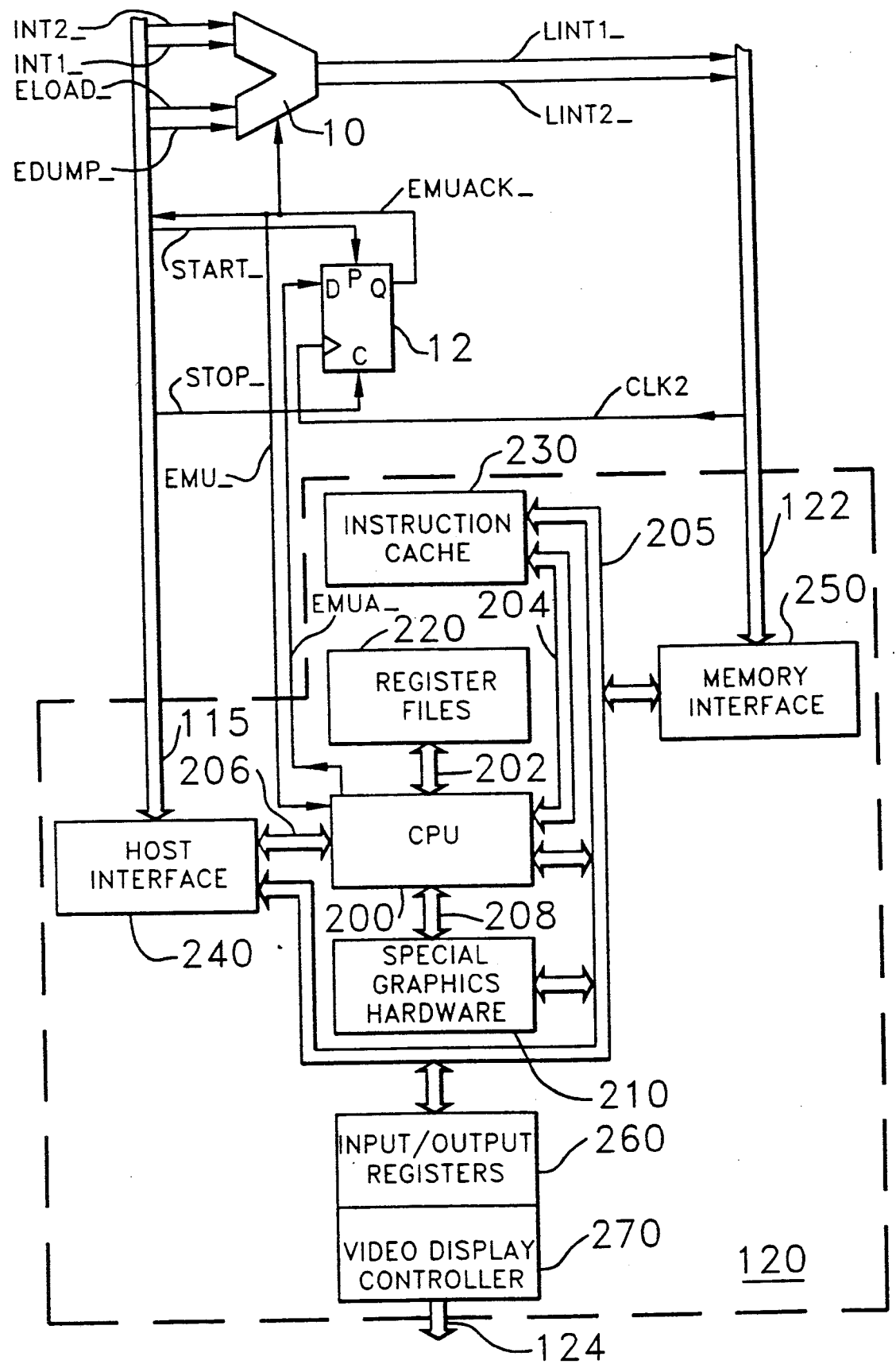
FIG. 18 is a block diagram illustrating the graphics processing apparatus with an additional embodiment of the additional hardware used in the operation of the emulation mode.

In addition to the enabling of the emulation mode by way of a dedicated signal on emulate enable line EMU—, a predetermined instruction code (e.g., op code 0100$_{16}$) may also be decoded by control ROM 1065 so as to generate an active signal on acknowledge line EMUA—, awaiting a dump or load signal on local interrupt lines LINT1 and LINT2—. Referring to FIG. 18, a block diagram is shown which has the requisite hardware and hardware connections to allow the presentation of an instruction code, rather than an active signal on emulate enable line EMU—, to begin the emulation routine.

Referring to FIG. 18, emulate enable line EMU— is no longer driven by a line in host bus 115, but instead is driven by the output of latch 12, i.e., line EMUACK—. Accordingly, as line EMUACK— is in its active low state, CPU 200 (microjump logic 1019) will receive the active signal on emulate enable line EMU—, causing graphics processor 120 to halt execution, as discussed above, loading the contents of program counter 1015 into microjump stack 1017, and loading the emulation routine vector into program counter 1015. Operation of the dump or load routines then can occur, as discussed above.

A line of host bus 115, designated as line START— in FIG. 18, is connected to the preset input of latch 12. This allows host processor 110, via host bus 115, to stop the emulation routine by causing a low-to-high transition on line START—, which will preset the output of latch 12 to a high state, presenting a high state signal on line EMU— to CPU 200, in turn causing graphics processor 120 to go into its RUN mode. In addition, another line of host bus 115, designated as STOP— in FIG. 18, is connected to the clear input of latch 12. A low-to-high transition on line STOP— will set the output of latch 12, or line EMUACK—, to its low active state, which in turn drives line EMU— into a low active state and causing graphics processor 120 to enter emulation mode. Accordingly, the arrangement of FIG. 18 allows both an instruction code to be presented to graphics processor 120 to cause the emulation mode, and also allows a line in host bus 115 (i.e., line STOP—) to provoke the emulation mode.

Figure 19:
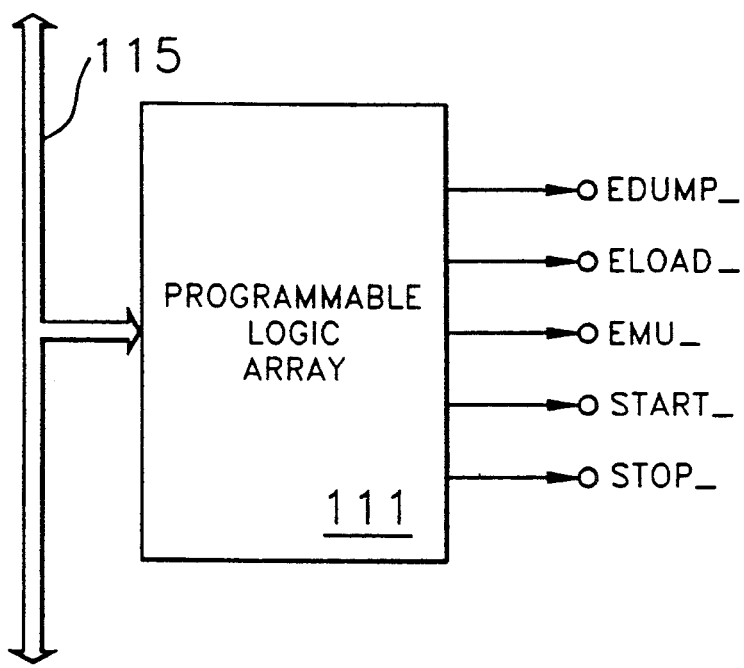
FIG. 19 is a block diagram of a programmable logic array useful in the operation of the emulation mode.

It should of course be noted that the generation of signals on lines EDUMP—, ELOAD—, EMU—, START— and STOP— may be made by way of dedicated or multiplexed lines in host bus 115, or may also be performed by means of additional logic inserted between host processor 110 and graphics processor 120. For example, a programmable logic array 111 as shown in FIG. 19 may have its inputs connected to the lines of host bus 115, and may have its outputs comprising, among other signals, the signals on lines EDUMP—, ELOAD—, EMU—, START— and STOP—. In this manner, the output of host processor 110 may be a digital word which, when decoded by programmable logic array 111, generates the necessary control signals required for the emulation mode of graphics processor 120. By use of programmable logic array 111, host processor 110 may generate the required signals for placing graphics processor 120 in emulation mode, and for enabling a sequence of the dump, load or wait routines merely by writing predetermined binary codes to the data bus of host processor 110. The predetermined codes available for such functions are made significantly greater by including programmable logic array 111 in the system. As a result, the use of programmable logic array 111 may provide for easier interface between host processor 110 and graphics processor 120, at little added cost to the user.

Figure 20:
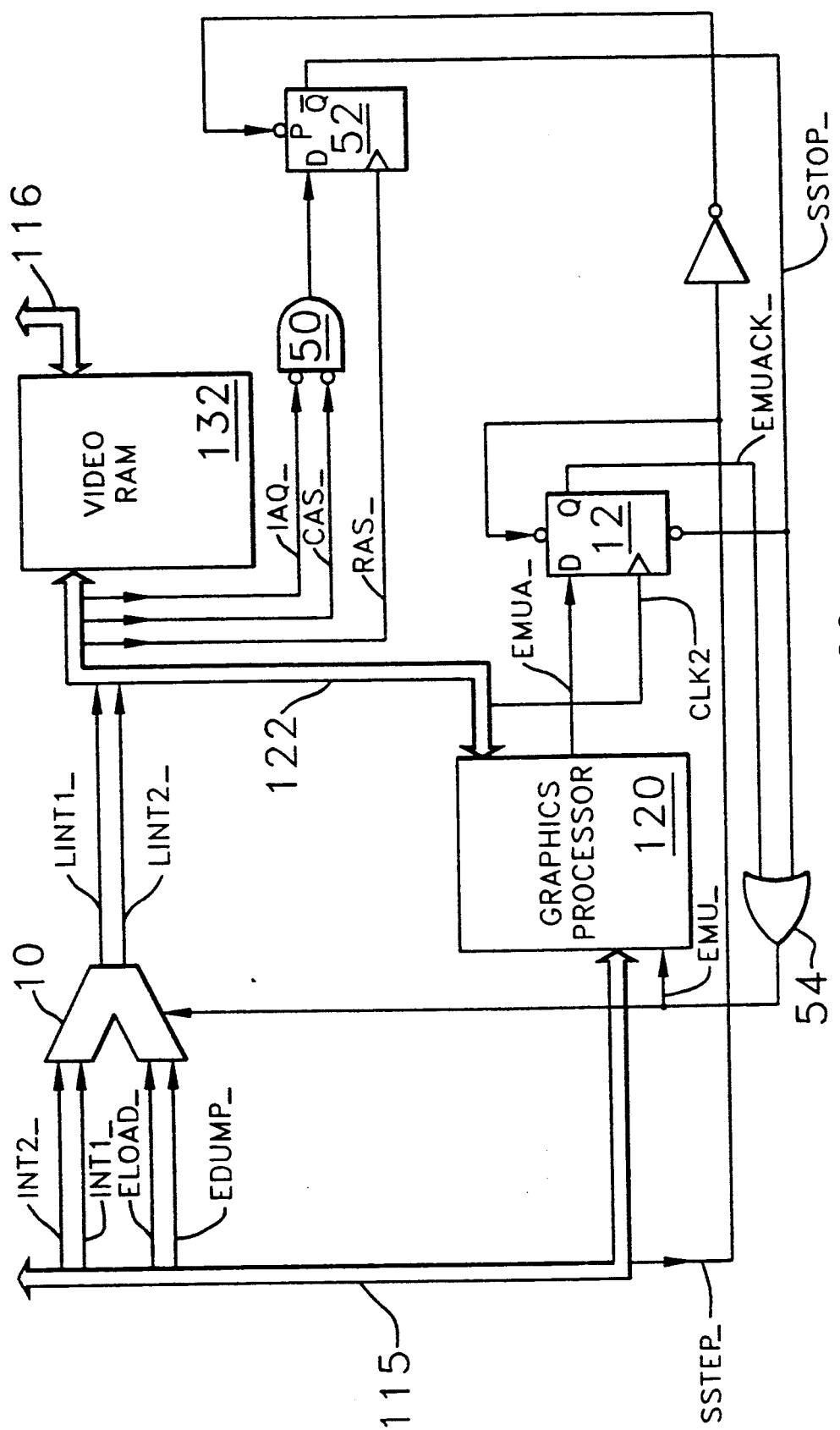
FIG. 20 is a block diagram illustrating the graphics processing apparatus with an additional embodiment of the additional hardware used in the operation of the emulation mode.

The control signals in video memory bus 122 which are used for access to video RAM 132 may also be used for causing graphics processor 120 to enter into emulation mode. Such an arrangement can be used to easily provide for instruction-by-instruction (single-step) operation of graphics processor 120, with the contents of register file 220 and registers in instruction cache 230 dumped after the execution of each instruction. FIG. 20 illustrates, in block diagram form, such a system embodying the invention in this form, including graphics processor 120, host processor 110, and video RAM 132, interconnected by way of the buses defined hereinabove, and utilizing said control signals from video memory bus 122 to cause graphics processor 120 to enter into emulation mode upon each access of video RAM 132. As noted above, video RAM 132 is also shown as addressable directly by host processor 110 via bus 116, so that the contents of video RAM 132 may be read or written to by host processor 110, separately from graphics processor 120. Video RAM 132 is addressable by way of a multiplexed address signal, as are many well known dynamic random access memory devices, such that a row address signal is latched by video RAM 132 responsive to an active signal on line RAS— (carrying signal 1220 previously referred to relative to the DRAM timing signals) of video memory bus 122, and such that a column address signal is latched by video RAM 132 responsive to an active signal on line CAS— (carrying signal 1230 previously referred to relative to the DRAM timing signals) of video memory bus 122. Line IAQ_ is a latched and inverted version of instruction acquisition signal IAQ, and thereby goes to a low level when video RAM 132 is accessed by way of video memory bus 122 when the instruction to be fetched from program memory is not available from instruction cache 230. In the system of FIG. 20, lines IAQ_ and CAS_ (both inverted) are connected to the inputs of AND gate 50, and the output of AND gate 50 is connected to the data input of D-type latch 52. Line RAS_ from video memory bus 122 is connected to the clock input of latch 52. The Q_ output of latch 52, designated as line SSTOP_ in FIG. 20, is connected to one input of OR gate 54, and is also connected to the clear input of latch 12. The preset input of latch 52 is connected to line SSTEP_ of host bus 115 (inverted twice); as discussed above, line SSTEP_ can be either a dedicated line of host bus 115, or may be another output of programmable logic array 111 which decodes digital words on host bus 115. Line SSTEP_ of host bus 115 (inverted) is also connected to the preset input of latch 12. The output of latch 12, line EMUACK_ as before, is connected to the other input of OR gate 54. The output of OR gate 54 is connected to line EMU_ of graphics processor 120, and also controls multiplexer 10, as in the case of FIG. 18.

The effect of the system of FIG. 20, in operation, is to cause graphics processor 120 to enter emulation mode upon each fetcher of an instruction from video RAM 132 (those portions of video RAM serving as program memory). By flushing instruction cache 230 of graphics processor 120 (i.e., by resetting all P flags in instruction cache 230 so as to force an instruction fetch from external program memory regardless of the address of the desired instruction), emulation mode will be entered upon each instruction. Graphics processor 120 can accordingly be placed in a "trace" mode, where its contents are dumped (or dumped and loaded) for each instruction.

Figure 21:
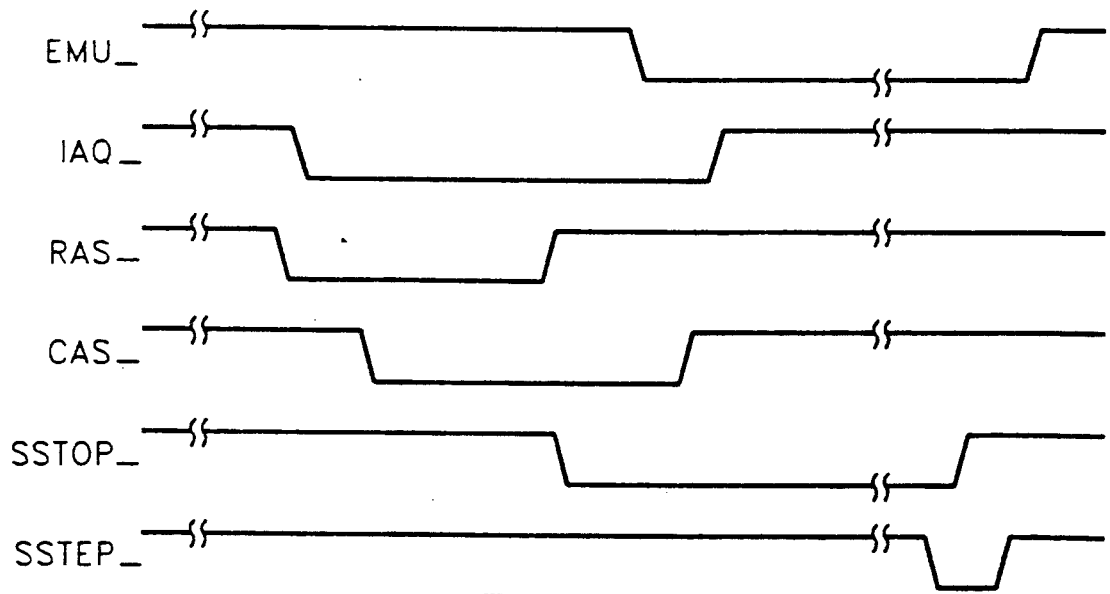
FIG. 21 is a timing diagram illustrating the operation of the system of FIG. 20.

Referring now to FIG. 21, the operation of the system of FIG. 20, insofar as the control of the entry of emulation mode is concerned, will be described in detail. It should be noted that, as in FIG. 17b, the multiplexed data and address signals generated during the emulation operation are implied, but not shown, in FIG. 21. It should be noted that once graphics processor 120 enters the emulation mode, of course, the dump, load and wait sequences are under the control of host processor 110 via lines EDUMP_ and ELOAD_, as described above. The initial condition illustrated in the timing diagram of FIG. 21 is the beginning of the execution of an instruction by graphic processor in the RUN mode, with instruction cache 230 disabled. This causes control signals to video RAM 132 to be presented via video memory bus 122, including active signals on lines RAS_, CAS_, and IAQ_. Instruction acquistion signal IAQ_ in FIG. 20 is the latched, inverted version of the instruction acquistion signal appearing on the most significant bit of the local address data bus, discussed above. During the time lines CAS_ and IAQ_ are low, the output of AND gate 50 is high. As line RAS_ goes high (prior to line CAS_ going high), the output of latch 52 will be set to a low state, i.e., line SSTOP_ will be in its active low state. As will be discussed below, the output of latch 12 (line EMUACK_) is in a low state at this time. This means that as line SSTOP_ makes the transition to its active low state, the output of OR gate 54 will go to a low state, presenting an active low signal on line EMU_ (implied in FIG. 21) of graphics processor 120, and causing multiplexer 10 to connect lines EDUMP_ and ELOAD_ of host bus 115 to interrupt lines LINT1_ and LINT2_, as in the embodiments described above (and also implied in FIG. 21). At the end of the execution of the instruction which was fetched from the program memory portion of video RAM 132, control ROM 1065 will accordingly generate an active low signal on line EMUA_, which will be latched onto the output of latch 12 as before. Graphics processor 120 is now in emulation mode, and the dump and load sequences may be executed as described above, depending upon the state of lines EDUMP_ and ELOAD_.

Upon the completion of the emulation routine, in order to cause the system of FIG. 20 to enter into the RUN mode for the execution of the next instruction, host bus 115 must provide a high-to-low transition on line SSTEP_. This will cause latch 12 to preset its output on line EMUACK_ to a high state, in turn driving a high state on the output of OR gate 54 and on line EMU_. Accordingly, the high-to-low transition of line SSTEP_ places graphics processor in RUN mode so that, as discussed above, program counter 1015 will be loaded with the contents stored by microjump logic 1019 in microjump stack 1017, and execution will then continue. A subsequent low-to-high transition on line SSTEP_ prior to the instruction fetch operation, will preset the output of latch 52 to a high state, so that line SSTOP_ is in its high state. This also clears latch 12, so that line EMUACK_ is in its low state during execution of the instruction; this allows the presence of active signals on lines CAS_, RAS_, and IAQ_, which cause an active low signal on line SSTOP_, to drive the output of OR gate 54 to a low state, again generating an active low signal on line EMU_ to graphics processor 120, and placing graphics processor 120 into emulation mode, as discussed above.

Although the invention has been described in detail herein with reference to its preferred embodiments, it is to be understood that this description is by way of example only, and is not to be construed in a limiting sense. It is to be further understood that numerous changes in the details of the embodiments will be apparent to, and may be made by, persons of ordinary skill in the art having reference to this description. It is contemplated that such changes and additional embodiments are within the spirit and scope of the invention as claimed below.

We claim:

1. A data processing apparatus having an arithmetic logic unit for executing data processing instructions, having at least one register, having a plurality of control terminals and having data terminals, the apparatus comprising:

an emulation control terminal for receiving an emulation control signal having a first logic state and a second logic state;

a stop circuit connected to said emulation control terminal and arithmetic logic unit for stopping execution of instructions by said arithmetic logic unit responsive to said emulation control signal being at its first logic state, and for enabling the execution of instructions by said arithmetic logic unit responsive to said emulation control signal being at its second logic state;

a dumping circuit responsive to said stop circuit stopping execution by said arithmetic logic unit and to a dump signal applied to one of said control terminals for writing the contents of said register to said data terminals; and a loading circuit responsive to said stop circuit stopping execution by said arithmetic logic unit and to a load signal applied to one of said control terminals for writing to said register the value of a digital signal applied to said data terminals.

2. The data processing apparatus of claim 1, wherein said data processing apparatus further has a plurality of registers;

and wherein said dumping circuit writes the contents of a series of said plurality of registers to said data terminals, responsive to said stop circuit stopping execution by said arithmetic logic unit and to said dump signal applied to said one of said control terminals.

3. The data processing apparatus of claim 2, wherein said loading circuit writes a series of values of digital signals applied to said data terminals to a series of said plurality of registers, responsive to said stop circuit stopping execution by said arithmetic logic unit and to said load signal being applied to said one of said control terminals.

4. The data processing apparatus of claim 3, including:
an addressing circuit connected to said dumping circuit for presenting a predetermined address at said data terminals associated with said contents of said register being written to said data terminals, said address and said contents of said register being time-multiplexed on said data terminals.

5. The data processing apparatus of claim 1, including:
an emulate acknowledge terminal; and
an acknowledge circuit connected to said stop circuit and to said emulate acknowledge terminal for presenting an acknowledge signal at said emulate acknowledge terminal responsive to said stop circuit stopping execution by said arithmetic logic unit.

6. The data processing apparatus of claim 5, including:
an addressing circuit connected to said dumping circuit for presenting a series of predetermined addresses at said data terminals associated with said contents of said series of plurality of registers being written to said data terminals, and also connected to said loading circuit for presenting a series of predetermined addresses at said data terminals prior to said loading circuit writing the series of values of the digital signal at said data terminals to said series of plurality of registers.

7. The data processing apparatus of claim 1, including:
an addressing circuit connected to said dumping circuit for presenting a predetermined address at said data terminals associated with said contents of said register being written to said data terminals, said address and said contents of said register being time-multiplexed on said data terminals.

8. The data processing apparatus of claim 7, wherein said addressing circuit is also connected to said loading circuit, for presenting a predetermined address at said data terminals prior to said loading circuit writing the value of the digital signal at said data terminals to said register.

9. The data processing apparatus of claim 1 including an instruction decoder circuit, said instruction decoder circuit receiving data processing instruction codes and generating control signals internal to said data processing apparatus;

wherein said dumping circuit is connected to said instruction decoder circuit so that, responsive to said instruction decoder circuit receiving a predetermined instruction code and responsive to said signal applied to said first one of said control terminals, said dumping circuit writes the contents of said register to said data terminals; and wherein said loading circuit is connected to said instruction decoder circuit so that, responsive to said instruction decoder circuit receiving said predetermined instruction code and responsive to said signal applied to said second one of said control terminals, said loading circuit writes to said register the value of a digital signal applied to said data terminals.

10. A data processing system comprising:
a first processor, connected to a host bus;
a memory, connected to a local bus for receiving address signals, data signals and control signals; and
a second processor, including:
an arithmetic logic unit for executing data processing instructions;
control logic, connected to said arithmetic logic unit and to said host bus, said control logic stopping said arithmetic logic unit responsive to an emulate control signal applied to said host bus, and said control logic receiving dump and load signals applied to said host bus; and
at least one register coupled to said local bus and to said arithmetic logic unit, and to said control logic;
a memory interface circuit, connected to said local bus, to said register, and to said control logic, for generating an address signal on said local bus responsive to said emulate control signal being applied to said host bus;
said memory interface circuit, responsive to said control logic receiving said dump signal and said emulate control signal applied to said host bus, outputting the contents of said register on said local bus and generating write control signals on said local bus;
and said memory interface circuit, responsive to said control logic receiving said load signal and said emulate control signal, generating a read control signal on said local bus and loading said register with digital data on said local bus.

11. The data processing system of claim 10, in which said second processor contains a plurality of registers;
and in which said memory interface circuit, responsive to said control logic receiving said emulate control signal, generates a series of address signals on said local bus, and sequentially outputs the contents of said plurality of registers and generates said write control signal responsive to said control logic receiving said dump signal, and said memory interface circuit also generates said read control signal and sequentially loads said plurality of registers with digital data on said local bus responsive to said control logic receiving said load signal.

12. The data processing system of claim 11, in which said control logic, responsive to receiving said emulate control signal, generates an emulate acknowledge signal on said host bus.

13. The data processing system of claim 10, in which said first processor is also connected to said memory, so that said data is read from the written to said memory by said first processor.

14. The data processing system of claim 10, wherein said control logic, responsive to a predetermined instruction code applied to said host bus by said first processor, stops said arithmetic logic unit, and controls said memory interface circuit to output said register and generate said write control signal to said local bus, and to generate said read signal to and load said register from said local bus, responsive to said control logic receiving said dump and load signals, respectively.

15. The data processing system of claim 10, wherein said control logic includes:
    a decoder for decoding instruction codes and for providing output control signals to said arithmetic logic unit, to said memory interface circuit, and to said register, responsive to said instruction codes;
    a program counter register, for storing an address corresponding to the next instruction code to be executed by said arithmetic logic;
    fetching logic, connected to said program counter register and to said memory interface circuit, for controlling said memory interface circuit to present said decoder with the contents of the memory location corresponding to the contents of the program counter register;
    a stack register; and
    a logic circuit, connected to said program counter register, to said stack register, and to said host bus, for loading said stack register with the contents of said program counter register and for loading said program counter register with a predetermined address value responsive to said emulate control signal applied to said host bus.

16. The data processing system of claim 15, wherein said decoder generates an emulate acknowledge signal on said host bus responsive to receipt of a first predetermined instruction code.

17. The data processing system of claim 16, wherein said memory contains said first predetermined instruction code at the location specified by said predetermined address value.

18. The data processing system of claim 15, wherein said logic circuit is connected to said output control signals of said decoder so that, responsive to said decoder being presented with a second predetermined instruction code, said logic circuit loads the contents of said stack register into said program counter register.

19. A data processing device, comprising:
    A. data registers adapted to contain data;
    B. a central processing unit, including microjump logic, connected to said data registers and adapted to address memory circuits with address signals and read and write data signals from and to said memory circuits and said data registers, said central processing unit being adapted in a normal mode to read data and instruction signals from said memory circuits and to process said data in response to said instruction signals, said central processing unit also being adapted in an emulation mode to write the contents of said registers to said memory circuits and to read the contents of said memory circuits into said registers; and
    C. an emulation enable terminal connected to said microjump logic, said microjump logic causing said central processing unit to enter said emulation mode upon receiving an emulation enable signal.

20. A data processing device comprising:
    A. a central processing unit, including microjump logic and control read only memory, having a normal mode of operation of processing data in response to instructions and having an emulation mode of operation for executing instructions;
    B. an emulation enable terminal connected to said microjump logic, said microjump logic causing said central processing unit to enter said emulation mode from said normal mode upon receiving an emulation enable signal; and
    C. an emulation acknowledge terminal connected to said control read only memory, which sends an emulation acknowledge signal to indicate that said central processing unit has entered said emulation mode.

21. A method of processing data, comprising:
    A. receiving an active state emulate enable signal;
    B. loading a stack register with the contents of a program counter in response to said receipt of said active state emulate enable signal;
    C. loading said program counter with a predetermined address value of emulation instruction code; and
    D. producing an active state emulate acknowledge signal.

* * * * *